US012664946B2

(12) United States Patent
Lee et al.

(10) Patent No.: US 12,664,946 B2
(45) Date of Patent: Jun. 23, 2026

(54) CONTROLLER, DISPLAY DEVICE INCLUDING THE SAME, ELECTRONIC DEVICE INCLUDING THE SAME, AND METHOD OF DRIVING THE DISPLAY DEVICE

(71) Applicant: SAMSUNG DISPLAY CO., LTD., Yongin-si (KR)

(72) Inventors: Neung Beom Lee, Yongin-si (KR); Tae Hyung Kim, Yongin-si (KR); Hee Beom Yang, Yongin-si (KR); Yong Sik Jung, Yongin-si (KR); Hyun Sik Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/978,506

(22) Filed: Dec. 12, 2024

(65) Prior Publication Data

US 2025/0384840 A1 Dec. 18, 2025

(30) Foreign Application Priority Data

Jun. 17, 2024 (KR) ........................ 10-2024-0078422
Jul. 15, 2024 (KR) ........................ 10-2024-0093190

(51) Int. Cl.
*G09G 3/3266* (2016.01)
*G09G 3/20* (2006.01)
(Continued)

(52) U.S. Cl.
CPC ............. *G09G 3/3266* (2013.01); *G09G 3/20* (2013.01); *G09G 3/32* (2013.01); *G09G 3/3233* (2013.01);
(Continued)

(58) Field of Classification Search
CPC ............. G09G 3/3648; G09G 2360/16; G09G 2320/0276; G09G 2320/0626;
(Continued)

(56) References Cited

U.S. PATENT DOCUMENTS

| | | | |
|---|---|---|---|
| 9,472,133 | B2 | 10/2016 | Kim et al. |
| 10,621,922 | B2 | 4/2020 | Oh et al. |

(Continued)

FOREIGN PATENT DOCUMENTS

| | | |
|---|---|---|
| KR | 10-2016-0056488 A | 5/2016 |
| KR | 10-2546774 B1 | 6/2023 |

*Primary Examiner* — Dismery Mercedes
(74) *Attorney, Agent, or Firm* — F. CHAU & ASSOCIATES, LLC

(57) ABSTRACT

A controller of a display device includes an input image data receiving circuit, a mode control circuit, a scan driving control circuit, and a power driving control circuit. The input image data receiving circuit receives input image data and generates a count value corresponding to the number of frames in which an image is continuously played based on a received vertical synchronization signal, memory write signal, and memory write sustain signal. The mode control circuit generates a mode indicator signal based on the count value and a luminance control signal. The scan driving control circuit outputs a gate control signal for controlling a clock based on the mode indicator signal. The power driving control circuit outputs a voltage control signal for controlling a level of a power voltage based on the mode indicator signal.

19 Claims, 14 Drawing Sheets

(51) Int. Cl.
*G09G 3/32* (2016.01)
*G09G 3/3233* (2016.01)
*G09G 3/3275* (2016.01)

(52) U.S. Cl.
CPC ..................... *G09G 3/3275* (2013.01); *G09G 2310/0267* (2013.01); *G09G 2310/0275* (2013.01); *G09G 2310/08* (2013.01); *G09G 2320/0233* (2013.01); *G09G 2320/0242* (2013.01); *G09G 2320/0271* (2013.01); *G09G 2320/0276* (2013.01); *G09G 2320/0626* (2013.01); *G09G 2320/0686* (2013.01); *G09G 2330/021* (2013.01); *G09G 2330/028* (2013.01); *G09G 2360/18* (2013.01)

(58) Field of Classification Search
CPC .............. G09G 2300/0819; G09G 2320/0673; G09G 2320/0285; G09G 3/2007; G09G 3/3607; G09G 3/3275; G09G 3/3266; G09G 3/32; G09G 3/3696; G09G 2320/0271; G09G 2320/0242; G09G 2320/0233; G09G 2320/02; G09G 2320/0238; G09G 2330/021; G09G 3/2003; G09G 2320/0666; G09G 2320/043; G09G 2330/028; G09G 2360/18; G09G 2320/062; G09G 2340/0428
See application file for complete search history.

(56) References Cited

U.S. PATENT DOCUMENTS

| | | | | |
|---|---|---|---|---|
| 11,893,929 | B2 | 2/2024 | Yang et al. | |
| 2005/0253785 | A1* | 11/2005 | Miyasaka | G09G 3/2011 345/63 |
| 2006/0279505 | A1* | 12/2006 | Nagato | G09G 3/3611 345/98 |
| 2008/0088650 | A1* | 4/2008 | Chen | G09G 3/3648 345/690 |
| 2009/0040201 | A1* | 2/2009 | Kim | G09G 3/344 345/204 |
| 2011/0057917 | A1* | 3/2011 | Ryu | G09G 3/3233 345/76 |
| 2016/0005370 | A1* | 1/2016 | Liu | G09G 3/3611 345/691 |
| 2017/0186375 | A1* | 6/2017 | Jung | G09G 3/3233 |
| 2017/0345386 | A1* | 11/2017 | Seo | G09G 3/3611 |
| 2018/0122300 | A1* | 5/2018 | Jang | G09G 3/3233 |
| 2019/0340981 | A1* | 11/2019 | Pyo | G09G 3/3291 |
| 2020/0193915 | A1* | 6/2020 | Noh | G09G 3/3233 |
| 2020/0302861 | A1* | 9/2020 | Pyo | G09G 3/3225 |
| 2020/0388228 | A1* | 12/2020 | Oh | G09G 5/373 |
| 2021/0225324 | A1* | 7/2021 | Furihata | G09G 3/3233 |
| 2021/0241699 | A1* | 8/2021 | Lee | G09G 3/3233 |

* cited by examiner

800

MODE1 MODE2

| MODE / GRAY SCALE | FIRST MODE | SECOND MODE |
|---|---|---|
| BLACK | 7.1 V | 7.4 V |

Vdata

CONTROLLER, DISPLAY DEVICE INCLUDING THE SAME, ELECTRONIC DEVICE INCLUDING THE SAME, AND METHOD OF DRIVING THE DISPLAY DEVICE

CROSS-REFERENCE TO RELATED APPLICATION

This application claims priority to and the benefit of Korean Patent Applications No. 10-2024-0078422, filed in the Korean Intellectual Property Office on Jun. 17, 2024, and No. 10-2024-0093190, filed in the Korean Intellectual Property Office on Jul. 15, 2024, the entire contents of which are incorporated by reference herein.

BACKGROUND

1. Field

One or more embodiments of the present disclosure relate to a controller, a display device including the same, an electronic device including the same, and a method of driving the display device.

2. Description of the Related Art

The use of display devices (such as liquid crystal display devices and organic light-emitting display devices) continues to increase in consumer electronics. An organic light-emitting display device may include light-emitting elements for generating light in various wavelength bands. Light-emitting elements may have different capacitances according to wavelength bands of generated light. Thus, the time for a light-emitting element to emit light may vary according to the colors to be emitted. Because the time for a light-emitting element to emit light varies according to the color to be emitted, color bleeding may be observed and visibility may be degraded.

SUMMARY

One or more embodiments described herein provide a controller capable of improving a color bleeding phenomenon, a display device including the same, an electronic device including the same, and a method of driving the display device.

Embodiments of the present disclosure may provide a controller including an input image data receiving circuit configured to receive input image data and generate a count value corresponding to the number of frames in which an image is continuously played based on a received vertical synchronization signal, memory write signal, and memory write sustain signal, a mode control circuit configured to generate a mode indicator signal based on the count value and a luminance control signal, a scan driving control circuit configured to output a gate control signal for controlling a clock based on the mode indicator signal, and a power driving control circuit configured to output a voltage control signal for controlling a level of a power voltage based on the mode indicator signal.

The input image data receiving circuit may generate a tearing signal based on the vertical synchronization signal.

The input image data receiving circuit may increase the count value when the memory write signal and the memory write sustain signal are input between periods in which the tearing signal is continuously input.

The mode control circuit may determine whether the received count value is greater than or equal to a preset threshold value and the luminance control signal has a value that is less than or equal to the preset threshold value.

The threshold value of the luminance control signal may be a minimum value that is greater than 0 among values of the luminance control signal.

The mode control circuit may output the mode indicator signal to have a first level when the received count value is less than the preset threshold value, or the luminance control signal has a value that is greater than the preset threshold value and may output the mode indicator signal to have a second level when the received count value is greater than or equal to the preset threshold value and the luminance control signal has the value that is less than or equal to the preset threshold value.

The first level may be a low level, and the second level may be a high level.

The scan driving control circuit may include a first mode unit and a second mode unit, and the gate control signal may include a start signal.

The first mode unit may output the start signal having a first number of pulses in response to the mode indicator signal having a first level.

The second mode unit may output the start signal having a second number of pulses that is greater than the first number in response to the mode indicator signal having a second level.

The power driving control circuit may include a first mode unit and a second mode unit, the first mode unit may output the voltage control signal for outputting the power voltage having a low voltage level in response to the mode indicator signal having a first level, and the second mode unit may output the voltage control signal for outputting the power voltage having a high voltage level in response to the mode indicator signal having a second level.

The first mode unit may output a gamma voltage for outputting a data signal having a black gray scale and a small margin.

The second mode unit may output the gamma voltage for outputting a data signal having a black gray scale and a large margin.

The controller may further include a data driving control circuit configured to output a data control signal for controlling a level of a data signal based on the mode indicator signal.

The data driving control circuit may include a first mode unit and a second mode unit and receives the input image data.

The first mode unit may output image data for generating a data signal having a black gray scale and a small margin based on the mode indicator signal having a first level and the input image data.

The second mode unit may output the image data for generating a data signal having a black gray scale and a large margin based on the mode indicator signal having a second level and the input image data.

The memory write signal may be signal indicating that the input image data of a next frame is received.

The memory write sustain signal may be a signal indicating that the input image data of the next frame is continuously being input.

Embodiments of the present disclosure may provide a display device including a display panel in which a plurality of subpixels are disposed and a power line connected to the plurality of subpixels is disposed, a data driver configured to supply a data signal to the plurality of subpixels based on a data control signal and image data, a gate driving circuit configured to supply a scan signal to the plurality of subpixels based on a gate control signal, a voltage generator configured to supply a gamma voltage to the data driver and an initialization voltage to the power line based on a voltage control signal, and a controller configured to receive input image data and change at least one of the gate control signal, the voltage control signal, and the image data based on the number of frames in which an image is continuously played and a luminance control signal for controlling luminance of an image displayed on the display panel.

At least one of the plurality of subpixels may include a pixel driving circuit to which a first power voltage is applied, and a light-emitting element including an anode connected to the pixel driving circuit and a cathode to which a second power voltage.

The initialization voltage may be applied to the anode through the pixel driving circuit.

The controller may generate a tearing signal based on a vertical synchronization signal.

The controller may increase a count value when a memory write signal and a memory write sustain signal are received during a period corresponding to one frame period during which the tearing signal is continuously input.

The controller may generate a mode indicator signal having a first level when the count value is greater than or equal to a preset threshold value and the received luminance control signal has a value that is less than or equal to the preset threshold value and may generate the mode indicator signal having a second level when the count value is less than or equal to the preset threshold value or the luminance control signal has the value that is greater than or equal to the preset threshold value.

The controller may output the voltage control signal for controlling a level of the initialization voltage to be lower than a level of the second power voltage based on the mode indicator signal with the first level and may output the voltage control signal for controlling the level of the initialization voltage to be higher than the level of the second power voltage based on the mode indicator signal with the second level.

Embodiments of the present disclosure may provide a method of driving a display device including a controller, the method including determining, by the controller, whether display luminance of an image is less than or equal to a preset threshold value and an image is played for a preset threshold period or more, displaying the image in a first mode when the display luminance of the image is greater than the preset threshold value, or the image is played for a period that is less than the preset threshold period, and displaying the image in a second mode when the display luminance of the image is lower than or equal to the preset threshold value and the image is played for the preset threshold period or more.

In the displaying of the image in the first mode, in the display device, an initialization voltage applied to an anode of a light-emitting element included in the display device may be applied at a first level that is lower than that of a power voltage applied to a cathode of the light-emitting element, in the display device, a data signal for displaying a black gray scale may be applied with a small margin, and in the display device, an on-bias voltage may be applied to a driving transistor, which is for supplying a driving current to the light-emitting element, a first number of times, and in the displaying of the image in the second mode, in the display device, the initialization voltage applied to the anode of the light-emitting element included in the display device may be applied at a second level that is higher than that of the power voltage applied to the cathode of the light-emitting element, in the display device, the data signal for displaying the black gray scale may be applied with a large margin, and in the display device, the on-bias voltage may be applied to the driving transistor a second number of times that is greater than the first number of times.

The first number of times may be three times, and the second number of times may be four or five times.

Embodiments of the present disclosure may provide an electronic device including a display panel in which a plurality of subpixels are disposed and a power line connected to the plurality of subpixels is disposed, a data driver configured to supply a data signal to the plurality of subpixels based on a data control signal and image data, a gate driving circuit configured to supply a scan signal to the plurality of subpixels based on a gate control signal, a voltage generator configured to supply a gamma voltage to the data driver and an initialization voltage to the power line based on a voltage control signal, a main processor configured to output a luminance control signal to control luminance of an image displayed on the display panel, and a controller configured to change at least one of the gate control signal, the voltage control signal, and the image data based on the number of frames in which an image is continuously played and the luminance control signal.

DETAILED DESCRIPTION

Figure 1:
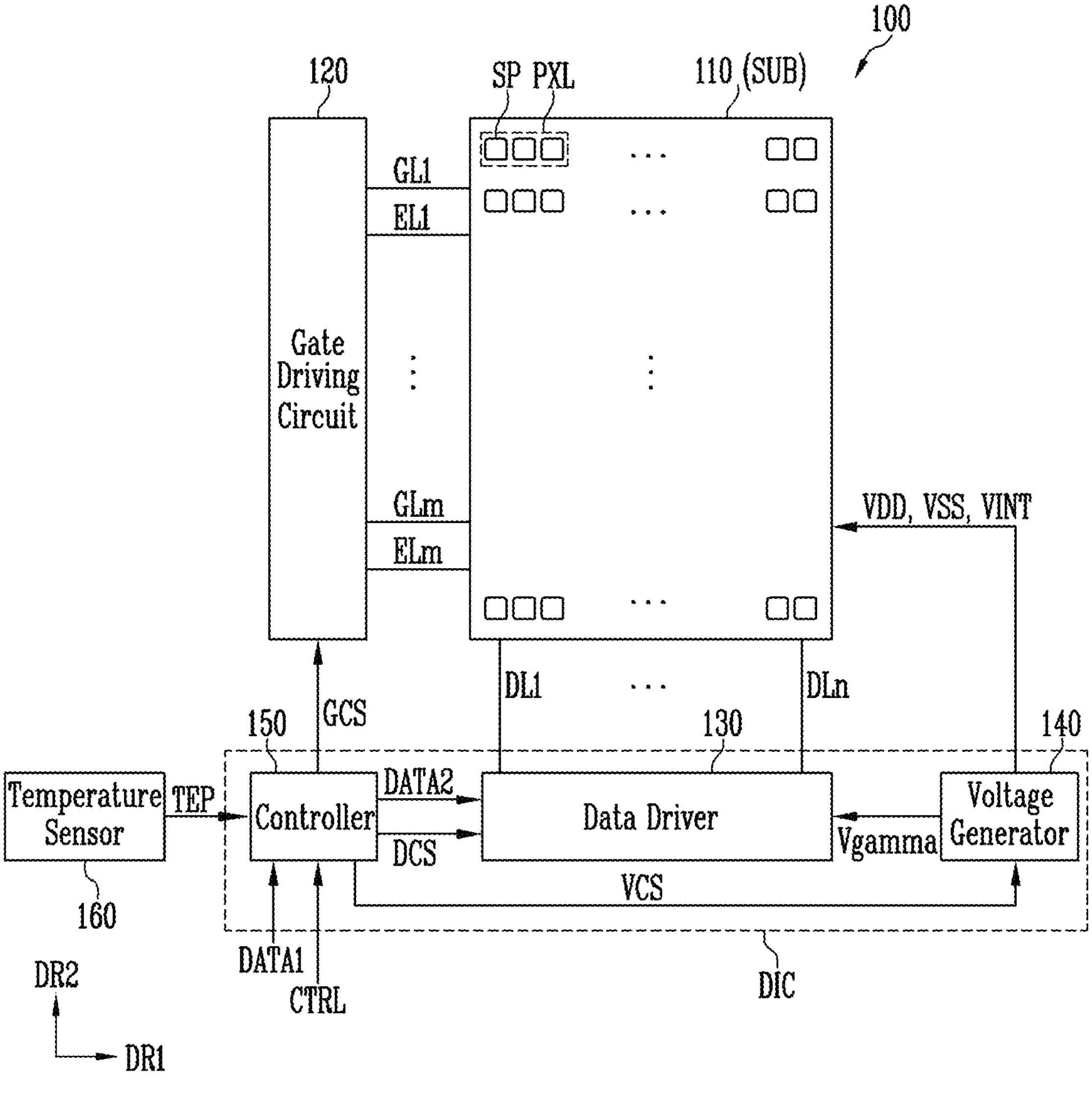
FIG. 1 is a system block diagram of a display device according to embodiments of the present disclosure.

Hereinafter, a plurality of embodiments of the present disclosure will be described in detail with reference to the accompanying drawings so that those skilled in the art may easily practice the present disclosure. It should be understood that the present disclosure may be embodied in different ways and is not limited to the following embodiments.

In order to clearly describe the present disclosure, portions not related to the description will be omitted. Like components will be denoted by like reference numerals throughout the specification. Therefore, the reference numerals described above may also be used in other drawings.

In addition, the sizes and thicknesses of the respective components shown in the drawings are arbitrarily shown for convenience of description, and thus one or more embodiments are not necessarily limited thereto. In the drawings, the thicknesses of layers and regions are exaggerated for clarity.

In addition, in the description, the expression "is the same" may mean "substantially the same." That is, it may be the same enough to convince those of ordinary skill in the art to be the same. In other expressions, "substantially" may be omitted.

The terms, "first," "second," and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element without departing from the scope of the present disclosure. An expression of a singular number includes an expression of the plural number, so long as it is clearly read differently.

Terms such as "below," "lower," "on," and "upper" are used to describe a relationship of configurations shown in the drawing. These terms are described as a relative concept based on an orientation shown in the drawing.

Unless otherwise defined, all terms (including technical and scientific terms) used herein have the same meaning as terms commonly understood by those skilled in the art to which the present disclosure pertains. In addition, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance.

Hereinafter, embodiments of the present disclosure will be described in detail with reference to the accompanying drawings.

FIG. 1 is a system block diagram of a display device 100 according to embodiments of the present disclosure.

Referring to FIG. 1, the display device 100 according to embodiments of the present disclosure may include a display panel 110, a gate driving circuit 120, a data driver 130, a voltage generator 140, a controller 150, and a temperature sensor 160.

The display panel 110 may include a plurality of pixels PXL, each including a plurality of subpixels SP. First to m-th gate lines GL1 to GLm (m is an integer of 2 or more) connected to the plurality of subpixels SP may be disposed on the display panel 110. First to n-th data lines DL1 to DLn (n is an integer of 2 or more) connected to the plurality of subpixels SP may be disposed on the display panel 110.

The plurality of subpixels SP may be connected to the gate driving circuit 120 through the first to m-th gate lines GL1 to GLm. The plurality of subpixels SP may be connected to the data driver 130 through the first to n-th data lines DL1 to DLn.

Each of the plurality of subpixels SP may include one light-emitting element configured to generate light. Each of the plurality of subpixels SP may generate (e.g., emit) light with a predetermined color. For example, each subpixel SP may generate light of a color such as red, green, blue, cyan, magenta, or yellow (for example, light with a specific color or light in a specific wavelength band). Two or more subpixels among the plurality of subpixels SP may constitute one pixel PXL. For example, as shown in FIG. 1, three subpixels may constitute one pixel PXL.

The gate driving circuit 120 may be connected to the plurality of subpixels SP (for example, the plurality of subpixels SP arranged in a first direction DR1) through respective ones of the first to m-th gate lines GL1 to GLm. For example, the first direction DR1 may be a direction crossing the display panel 110 from one side (for example, a left side) to an opposing side (for example, a right side) of the display panel 110. For example, the first direction DR1 may be a row direction.

In response to a gate control signal GCS output from the controller 150, the gate driving circuit 120 may output gate signals (for example, gate signals with a turn-on level or a turn-off level) to the first to m-th gate lines GL1 to GLm. In embodiments, the gate control signal GCS may include a start signal indicating the start of each frame, a horizontal synchronization signal for outputting gate signals in synchronization with a timing at which data signals are applied, and the like.

In embodiments, first to m-th emission control lines EL1 to ELm may be connected to respective ones of the plurality of subpixels SP on the display panel 110. The first to m-th emission control lines EL1 to ELm may be disposed to extend in the row direction in the display panel 110. The plurality of subpixels SP may be connected to the first to m-th emission control lines EL1 to ELm. In the above embodiment, the gate driving circuit 120 may include an emission control driver configured to control the first to m-th emission control lines EL1 to ELm. The emission control driver may be included, for example, in the gate driving circuit 120 or may be provided separately from the gate driving circuit 120. The emission control driver may operate under the control of the controller 150.

The gate driving circuit 120 may be disposed at one side of the display panel 110. However, embodiments are not limited thereto. For example, the gate driving circuit 120 may be divided into two or more physically and/or logically separated driving circuits, and such driving circuits may be positioned at one side and/or the other side (for example, the other side opposite to the one side of the display panel 110) in the display panel 110. As such, the gate driving circuit 120 may be disposed in various forms in the display panel 110 or around the display panel 110 according to embodiments.

The data driver 130 may be connected to the plurality of subpixels SP through the first to n-th data lines DL1 to DLn, respectively, which extend in a second direction DR2. For example, the second direction DR2 may be a direction crossing the display panel 110 from one side (for example, a lower side) to the other side (for example, an upper side). For example, the second direction DR2 may be a column direction.

The data driver 130 may receive image data DATA2 and a data control signal DCS from the controller 150. The data driver 130 may operate in response to the data control signal DCS. In embodiments, the data control signal DCS may include a source start pulse signal, a source shift clock signal, a source output enable signal, or the like.

By using voltages (for example, a gamma voltages Vgamma) output from the voltage generator 140, the driver 130 may apply data signals to the first to n-th data lines DL1 to DLn. The data signals may have gray scale voltages corresponding to the image data DATA2. When a gate signal (for example, a gate signal with a turn-on level) is applied to each of the first to m-th gate lines GL1 to GLm, data signals corresponding to the image data DATA2 may be applied to the data lines DL1 to DLn. Each of the plurality of subpixels SP may receive a data signal applied at a corresponding timing in response to a gate signal (for example, a gate signal with a turn-on level). The plurality of subpixels SP may generate light corresponding to an input data signal. Accordingly, an image may be displayed on the display panel 110.

In embodiments, each of the gate driving circuit 120 and the data driver 130 may include complementary metal-oxide semiconductor (CMOS) circuit elements.

The voltage generator 140 may operate in response to a voltage control signal VCS from the controller 150. The voltage generator 140 may be configured to generate a plurality of voltages and provide the generated voltages to components of the display device 100. For example, the voltage generator 140 may receive an input voltage from an external source relative to the display device 100. The voltage generator 140 may adjust (for example, lower) a level of a received voltage and regulate the level-adjusted voltage. The voltage generator 140 may be configured to generate a plurality of voltages.

The voltage generator 140 may generate a plurality of voltages in addition to the gamma voltage(s). For example, the voltage generator 140 may generate a first power voltage VDD, a second power voltage VSS, and an initialization voltage VINT for controlling operation of the subpixels SP. The generated first and second power voltages VDD and VSS and initialization voltage VINT may be applied (for example, commonly applied) to the plurality of subpixels SP. The first power voltage VDD may have a relatively high voltage level. The second power voltage VSS may have a lower voltage level than the first power voltage VDD. The generated gamma voltage(s) Vgamma may be provided to the data driver 130. In other embodiments, at least one of the first power voltage VDD or the second power voltage VSS may be provided by an external device (for example, a power management integrated circuit (PMIC)) of the display device 100.

The voltage generator 140 may variably adjust a voltage level of the initialization voltage VINT in response to the voltage control signal VCS. For example, in response to the voltage control signal VCS, the voltage generator 140 may generate the initialization voltage VINT at a higher voltage level than the second power voltage VSS or generate the initialization voltage VINT at a lower voltage level than the second power voltage VSS.

According to embodiments, the voltage generator 140 may generate different voltages. For example, during a sensing operation of sensing electrical characteristics of transistors and/or the light-emitting element(s) of the plurality of subpixels SP, a certain reference voltage may be applied to the first to n-th data lines DL1 to DLn, and the voltage generator 140 may generate such a reference voltage.

The controller 150 may be configured to control overall operation of the display device 100. The controller 150 may receive input image data DATA1 and a control signal CTRL for controlling the display of the input image data DATA1 from an external system (for example, a host system). The controller 150 may provide the gate control signal GCS, the data control signal DCS, and the voltage control signal VCS in response to the received control signal CTRL.

The host system that outputs the input image data DATA1 and the control signal CTRL may include, for example, an application processor (AP), a set-top box, a graphics processor, or the like.

The controller 150 may output image data DATA2 by converting the input image data DATA1 to be suitable for the display device 100 or display panel 110. In embodiments, the controller 150 may output the image data DATA2 by aligning the input image data DATA1 to be suitable for the subpixels SP in a row unit.

Two or more components of the data driver 130, the voltage generator 140, and the controller 150 may be mounted on one integrated circuit. As shown in FIG. 1, the data driver 130, the voltage generator 140, and the controller 150 may be included in a driver integrated circuit DIC. In this case, the data driver 130, the voltage generator 140, and the controller 150 may be components functionally separated in one driver integrated circuit DIC. In other embodiments, at least one of the data driver 130, the voltage generator 140, and the controller 150 may be mounted in the driver integrated circuit DIC, and the other thereof may be provided to be mounted in an integrated circuit that is different from the driver integrated circuit DIC.

The temperature sensor 160 is configured to detect a temperature (for example, an ambient temperature) and generate temperature data TEP indicating the detected temperature. According to embodiments, the temperature sensor 160 may be disposed at a predetermined location on the display panel 110. According to embodiments, the temperature sensor 160 may be disposed adjacent to the display panel 110 and/or the driver integrated circuit DIC. According to embodiments, the display device 100 may include multiple (e.g., two or more) temperature sensors 160.

The controller 150 may control various operations of the display device 100 in response to the temperature data TEP. In embodiments, the controller 150 may adjust the luminance of an image output from the display panel 110 in response to the temperature data TEP. For example, the controller 150 may control components such as the data driver 130 and/or the voltage generator 140 to adjust at least one of data signals input to the display panel 110, the first power voltage VDD, and/or the second power voltage VSS.

Figure 2:
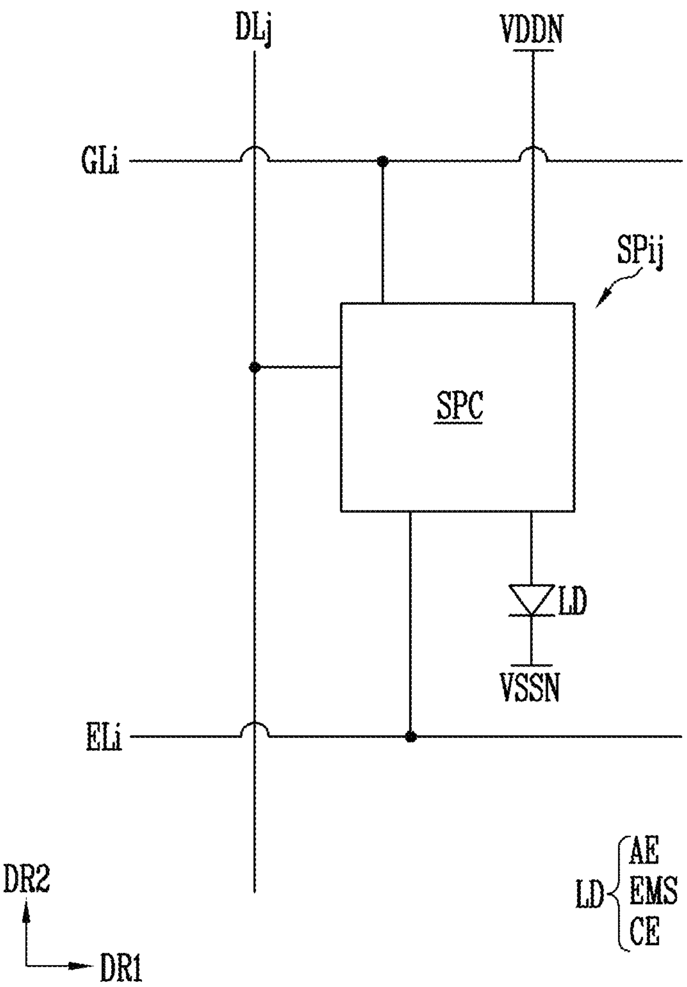
FIG. 2 is a block diagram illustrating an embodiment of any one subpixel of subpixels of FIG. 1.

FIG. 2 is a block diagram illustrating an embodiment that is representative of any one subpixel of the subpixels SP of FIG. 1. In FIG. 2, among the plurality of subpixels SP shown in FIG. 1, the subpixel SPij is shown as being disposed on an i-th row (i is an integer of 1 or more) and a j-th column (j is an integer of 1 or more) of the display panel 110.

Referring to FIG. 2, the subpixel SPij may include a subpixel circuit SPC and a light-emitting element LD. The light-emitting element LD may be connected between a first power voltage node VDDN and a second power voltage node VSSN. The first power voltage node VDDN may be a node to which the first power voltage VDD of FIG. 1 is applied. The second power voltage node VSSN may be a node to which the second power voltage VSS of FIG. 1 is applied.

The light-emitting element LD may include a first electrode, an emission structure EMS, and a second electrode. The first electrode may be an anode AE or a cathode CE of the light-emitting element LD. The second electrode may be the other of the anode AE or the cathode CE of the light-emitting element LD. For convenience of description, an example in which the first electrode of the light-emitting element LD is the anode AE, and the second electrode of the light-emitting element LD is the cathode CE, will be described below.

The anode AE of the light-emitting element LD may be connected to the first power voltage node VDDN through the subpixel circuit SPC. The cathode CE of the light-emitting element LD may be connected to the second power voltage node VSSN. For example, the anode AE of the light-emitting element LD may be connected to the first power voltage node VDDN through one or more transistors (e.g., including a driving transistor) included in the subpixel circuit SPC.

The subpixel circuit SPC of the subpixel SPij may be connected to an i-th gate line GLi among the first to m-th gate lines GL1 to GLm of FIG. 1. The subpixel circuit SPC of the subpixel SPij may be connected to an i-th emission control line ELi among the first to m-th emission control lines EL1 to ELm of FIG. 1. The subpixel circuit SPC of the subpixel SPij may be connected to a j-th data line DLj among the first to n-th data lines DL1 to DLn of FIG. 1. The subpixel circuit SPC is configured to control an emission timing and/or emission luminance of the light-emitting element LD according to (or in response to) signals received through such signal lines.

The subpixel circuit SPC may operate in response to a gate signal received through the i-th gate line GLi. The subpixel circuit SPC may operate in response to an emission control signal received through the i-th emission control line ELi.

The subpixel circuit SPC may receive a data signal through the i-th data line DLj. In response to a gate signal (for example, a gate signal with a turn-on level) received through the i-th gate line GLi, the subpixel circuit SPC may store a voltage of a data signal (or a voltage corresponding to the data signal). In response to an emission control signal (for example, an emission control signal with a turn-off level) applied through the i-th emission control line ELi, the subpixel circuit SPC may adjust a timing at which a current flows in (e.g., from a driving transistor to) the light-emitting element LD. The magnitude of current flowing in the light-emitting element LD may vary according to the voltage stored in the subpixel circuit SPC. The light-emitting element LD may generate light with a luminance corresponding to a data signal.

Figure 3:
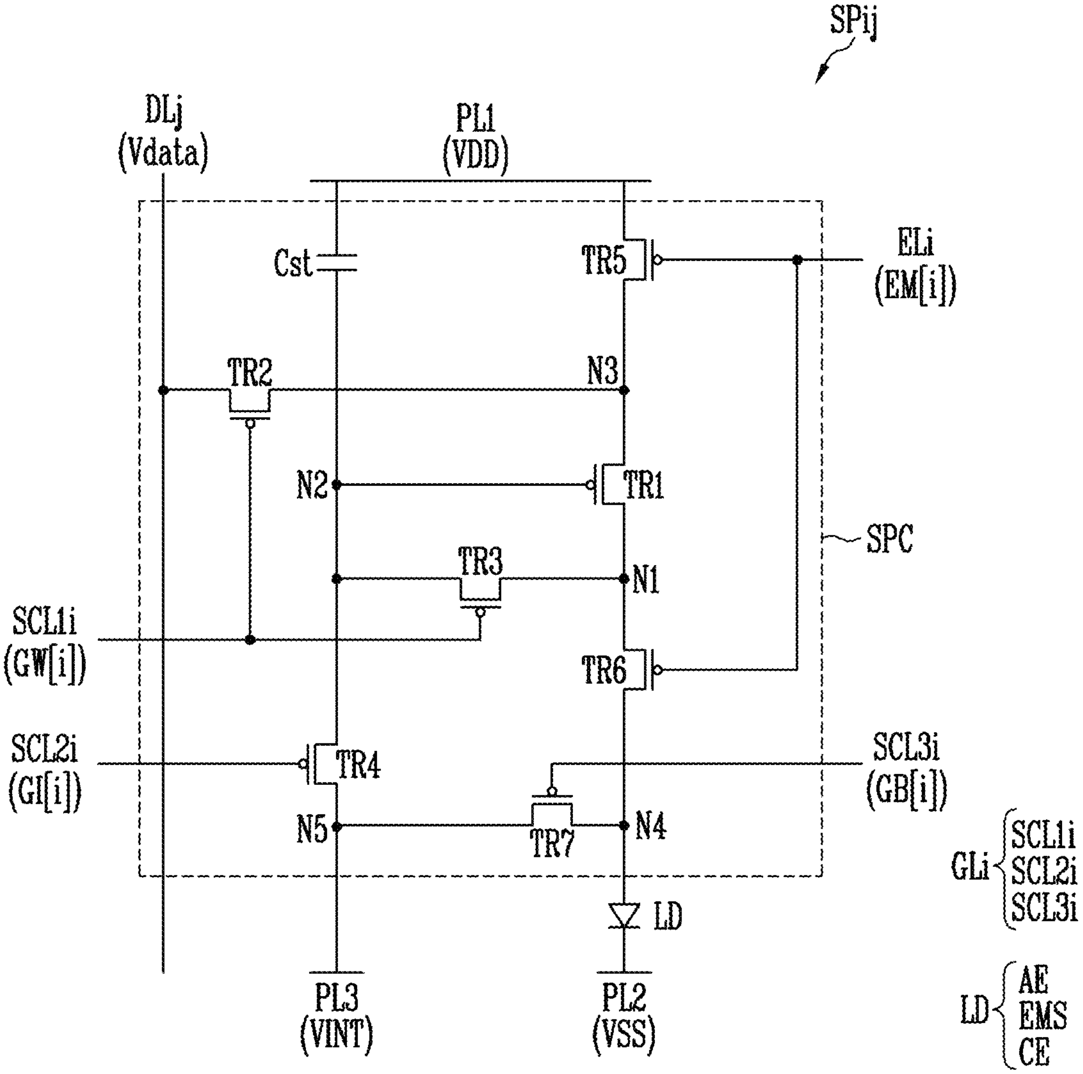
FIG. 3 is an equivalent circuit diagram of the subpixel of FIG. 2 according to one embodiment.

FIG. 3 is an equivalent circuit diagram of the subpixel SPij of FIG. 2 according to one embodiment. The subpixel circuit SPC may be connected to the light-emitting element LD as shown in FIG. 2 and as more specifically shown in FIG. 3.

The subpixel circuit SPC according to embodiments of the present disclosure may include two or more switching elements (for example, transistors) and one or more storage elements (for example, capacitors). As an example, the subpixel circuit SPC according to embodiments of the present disclosure may include seven transistors and one capacitor, e.g., may have a 7T-1C structure. However, embodiments of the present disclosure are not limited thereto. Hereinafter, for convenience of description, in embodiments of the present disclosure, an embodiment in which seven transistors and one capacitor are included will be described.

Referring to FIG. 3, the subpixel circuit SPC according to embodiments of the present disclosure may include first to seventh transistors TR1 to TR7 and a storage capacitor Cst.

The first transistor TR1 may operate as a driving transistor and may include a first electrode connected to a first node N1, a gate electrode connected to a second node N2, and a second electrode connected to a third node N3. The first electrode may be any one of a source electrode and the drain electrode, for example, a drain electrode. The second electrode may be the other of the source electrode and the drain electrode, for example, the source electrode. The first transistor TR1 may be configured to supply a current (for example, a driving current) corresponding to a magnitude of a voltage (e.g., a stored voltage proportional to a data voltage Vdata) applied to the second node N2.

The second transistor TR2 may be configured to switch the electrical connection between the third node N3 and the j-th data line DLj. The second transistor TR2 may include a gate electrode connected to an i-th first sub-gate line SCL1*i* (hereinafter also abbreviated as a first sub-gate line SCL1*i*) to which a first gate signal GW[i] is applied. In response to the first gate signal GW[i] with a turn-on level, the second transistor TR2 may electrically connect the j-th data line DLj and the third node N3 for transferring the data voltage Vdata to node N2, as will be explained in greater detail below.

The third transistor TR3 may be configured to switch the electrical connection between the first node N1 and the second node N2. The third transistor TR3 may include a gate electrode connected to the first sub-gate line SCL1*i* to which the first gate signal GW[i] is applied. The third transistor TR3 may electrically connect the first node N1 and the second node N2 in response to the first gate signal GW[i] with a turn-on level. When the third transistor TR3 is turned on, the first (driving) transistor TR1 may be connected in the form of a diode.

The fourth transistor TR4 may be configured to switch the electrical connection between the second node N2 and a third power line PL3 (or a fifth node N5). The initialization voltage VINT (previously discussed in relation to FIG. 1) may be applied to the third power line PL3. The fourth transistor TR4 may include a gate electrode connected to an i-th second sub-gate line SCL2*i* (hereinafter also abbreviated as a second sub-gate line SCL2*i*) to which a second gate signal GI[i] is applied. The fourth transistor TR4 may electrically connect the second node N2 and the third power line PL3 in response to the second gate signal GI[i] with a turn-on level, thereby initializing the second node N2.

The fifth transistor TR5 may be configured to switch the electrical connection between the third node N3 and a first power line PL1. The first power voltage VDD may be applied to the first power line PL1. The fifth transistor TR5 may include a gate electrode connected (for example, electrically connected) to the i-th emission control line ELi (hereinafter abbreviated as an emission control line ELi) to which an emission control signal EM[i] is applied. The fifth transistor TR5 may block the electrical connection between the first power line PL1 and the third node N3 in response to the emission control signal EM[i] with a turn-off level. The fifth transistor TR5 may electrically connect the first power line PL1 and the third node N3) in response to the emission control signal EM[i] with a turn-on level.

The sixth transistor TR6 may operate simultaneously with the fifth transistor T5, and may be configured to switch the electrical connection between the first node N1 and a fourth node N4. The sixth transistor TR6 may include a gate electrode connected to the emission control line ELi. The sixth transistor TR6 may block the electrical connection between the first node N1 and the fourth node N4 in response to the emission control signal EM[i] with a turn-off level. The sixth transistor TR6 may electrically connect the first node N1 and the fourth node N4 in response to the emission control signal EM[i] with a turn-on level. The fifth transistor TR5 and the sixth transistor TR6 may be operated to induce emission of light from the light emitting element LD.

The seventh transistor TR7 may be configured to switch the electrical connection between the fourth node N4 and the third power line PL3 (or the fifth node N5). The seventh transistor TR7 may include a gate electrode connected to an i-th third sub-gate line SCL3*i* (hereinafter also abbreviated as a third sub-gate line SCL3*i*) to which a third gate signal GB[i] is applied. The seventh transistor TR7 may electrically connect the fourth node N4 and the third power line PL3, thorugh the fifth node N5, in response to the third gate signal GB[i] with a turn-on level, to thereby initialize the anode AE of the light emitting element LD.

The storage capacitor Cst may include a first electrode and a second electrode positioned opposite to the first electrode. The first electrode may be connected to the second node N2. The second electrode may be part of the first power line PL1 or may be electrically connected to the first power line PL1. The storage capacitor Cst may be configured to store a voltage applied to the second node N2 (e.g., the data voltage Vdata) for a certain period (for example, one frame period).

The light-emitting element LD may be connected between the fourth node N4 and the second power line PL2. The second power voltage VSS may be applied to the second power line PL2. A node at which the light-emitting element LD is connected to the second power line PL2 may correspond to the second power voltage node VSSN described above in FIG. 2. In one embodiment, the light-emitting element LD may include the anode AE connected to the fourth node N4 and the cathode CE connected to the second power line PL2. The emission structure EMS may be connected to the anode AE and the cathode CE. In one embodiment, the emission structure EMS may include an organic emission layer or an inorganic emission layer. However, embodiments of the present disclosure are not limited thereto.

Referring to FIG. 3, an embodiment in which the gate electrode of the fifth transistor TR5 and the gate electrode of the sixth transistor TR6 are connected to the same emission control line ELi is shown. However, embodiments of the present disclosure are not limited thereto, and the gate electrodes of the fifth transistor TR5 and TR6 may be connected to different emission control lines in other embodiments.

Referring to FIG. 3, the gate electrode of the second transistor TR2 and the gate electrode of the third transistor TR3 are illustrated as being connected to one sub-gate line (for example, the first sub-gate line SCL1*i*). However, embodiments of the present disclosure are not limited thereto, and the gate electrode of the second transistor TR2 and the gate electrode of the third transistor TR3 may be connected to different sub-gate lines, respectively, in other embodiments.

Each of the first to seventh transistors TR1 to TR7 may include a semiconductor layer. The semiconductor layer may include a channel region overlapping an associated gate electrode, a source region positioned at one side of the channel region, and a drain region positioned at an opposing side of the channel region. In one embodiment, one or more of the transistors of the subpixel circuit SPC may include a metal-oxide-semiconductor field-effect transistor (MOSFET), but embodiments of the present disclosure are not limited thereto. For example, one or more of transistors of the subpixel circuit SPC may include a bipolar junction transistor (BJT).

In one embodiment, all or a portion of the first to seventh transistors TR1 to TR7 may include a P-type semiconductor layer. In a transistor including a P-type semiconductor layer, a low level voltage may be a turn-on level voltage, and a high level voltage may be a turn-off level voltage. In one embodiment, the transistor including the P-type semiconductor layer may be formed via a low temperature polycrystalline silicon (LTPS) process.

In one embodiment, all or a portion of the transistors in the subpixel circuit SPC may include an N-type semiconductor layer. For example, among the first to seventh transistors TR1 to TR7, the third transistor TR3 and the fourth transistor TR4 may be implemented as transistors including an N-type semiconductor layer. In the above embodiment, the third transistor TR3 and the fourth transistor TR4 may include a metal oxide semiconductor.

Figure 4:
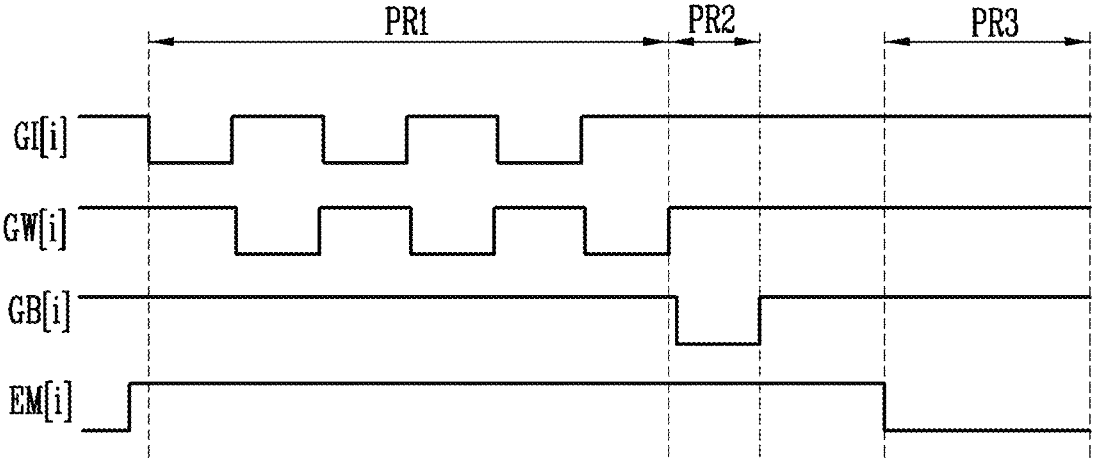
FIG. 4 is a timing diagram of the subpixel of FIG. 3 according to one embodiment.

FIG. 4 is a timing diagram for describing operation of the subpixel SPij of FIG. 3 according to one embodiment. Hereinafter, the timing diagram of FIG. 4 will be described with reference to FIG. 3.

Referring to FIG. 4, a first period PR1, a second period PR2, and a third period PR3 are shown. The first period PR1 is an initialization and data writing period. The first period PR1 may be a period in which an initialization voltage VINT is supplied to the second node N2 to initialize the second node N2. In addition, the first period PR1 may be a period provided to alleviate the shift of a current-voltage characteristic curve due to the hysteresis characteristic of a first transistor TR1, by repeatedly applying an on-bias voltage to the first transistor TR1. Thus, visibility may be improved. In the first period PR1, during a period in which a first scan signal GW[i] with a turn-on level is finally written, a data signal Vdata may be written corresponding to an image to be displayed in the corresponding subpixel SPij.

In the first period PR1, the first scan signal GW[i] may be applied in an alternating pattern having a turn-off level and a turn-on level. The second scan signal GI[i] may be applied in an alternating pattern having a turn-on level and a turn-off level. The first scan signal GW[i] may be shifted in phase relative to the second scan signal GI[i]. For example, in a period in which the first scan signal GW[i] has a turn-on level, the second scan signal GI[i] may have a turn-off level. In a period in which the second scan signal GI[i] has a turn-on level, the first scan signal GW[i] may have a turn-off level. In the first period PR1, the third scan signal GB[i] may have a turn-off level throughout all or a portion of the period PR1. Also, the emission control signal EM[i] may have a turn-off level throughout all or a portion of the period PR1.

The second period PR2 may be a period for initializing the fourth node N4 of the subpixel SPij. When the third scan signal GB[i] having a turn-on level is applied in the second period PR2, the seventh transistor TR7 may be turned on. Thus, the fourth node N4 may be electrically connected to a third power line PL3, and an initialization voltage VINT may be applied to the fourth node N4. In the second period PR2, the first scan signal GW[i] having a turn-off level and the second scan signal GI[i] having a turn-off level may be applied. In the second period PR2, the emission control signal EM[i] having a turn-off level may be applied.

The third period PR3 may be a period during which the subpixel SPij emits light. In the third period PR3, the emission control signal EM[i] with a turn-on level may be applied to the gate electrodes of the fifth transistor TR5 and the sixth transistor TR6. In the third period PR3, the first scan signal GW[i] having a turn-off level, the second scan signal GI[i] having a turn-off level, and the third scan signal GB[i] having a turn-off level may be applied. In the third period PR3, the subpixel SPij may emit light at a luminance corresponding to the data signal Vdata input at the end of the first period PR1.

Figure 5:
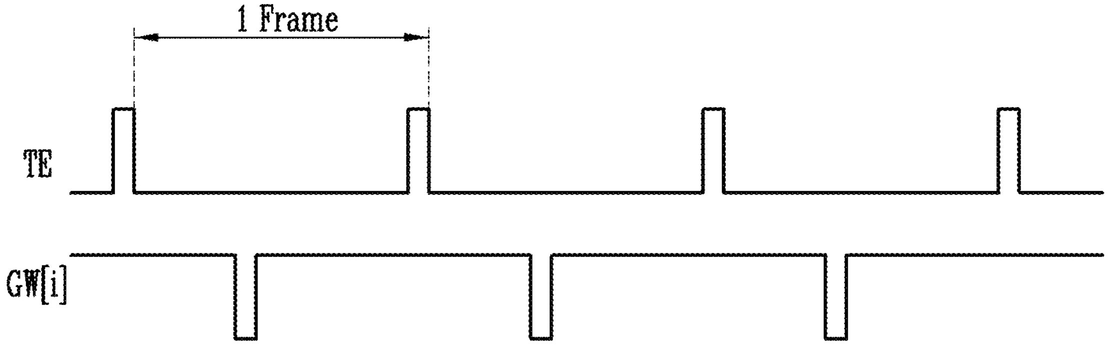
FIG. 5 is a diagram for describing a tearing signal.

FIG. 5 is a diagram for describing a tearing signal TE. For convenience of description, the first scan signal GW[i] is illustrated together with the tearing signal TE in FIG. 5 and is illustrated as having a turn-on level only once per frame. The period during which the first scan signal GW[i] has a turn-on level may be understood as a period during which the data signal is written into the storage capacitor for allowing the subpixel SPij to emit light. However, the embodiments of the present disclosure are not limited thereto, and as described above with reference to FIG. 4, the first scan signal GW[i] may have a turn-on level two or more times in one frame.

Referring to FIG. 5, the tearing signal TE according to embodiments of the present disclosure may correspond to a signal indicating one frame period. The tearing signal TE may have the same or similar function as a vertical synchronization signal (also referred to as a Vsync signal) for indicating the start of a frame. The tearing signal TE may be a signal generated, for example, internally in above-described controller 150 (e.g., see FIG. 1). For example, the controller 150 may receive a vertical synchronization signal as one of control signals CTRL and may generate the tearing signal TE based on the received vertical synchronization signal.

The length of one frame period may be determined based on the signal level of the tearing signal TE. For example, a period between times points at which the tearing signal TE consecutively transitions from a high level to a low level may be determined as one frame period. During one frame period, the first scan signal GW[i] with a turn-on level may be applied at least once.

Figure 6:
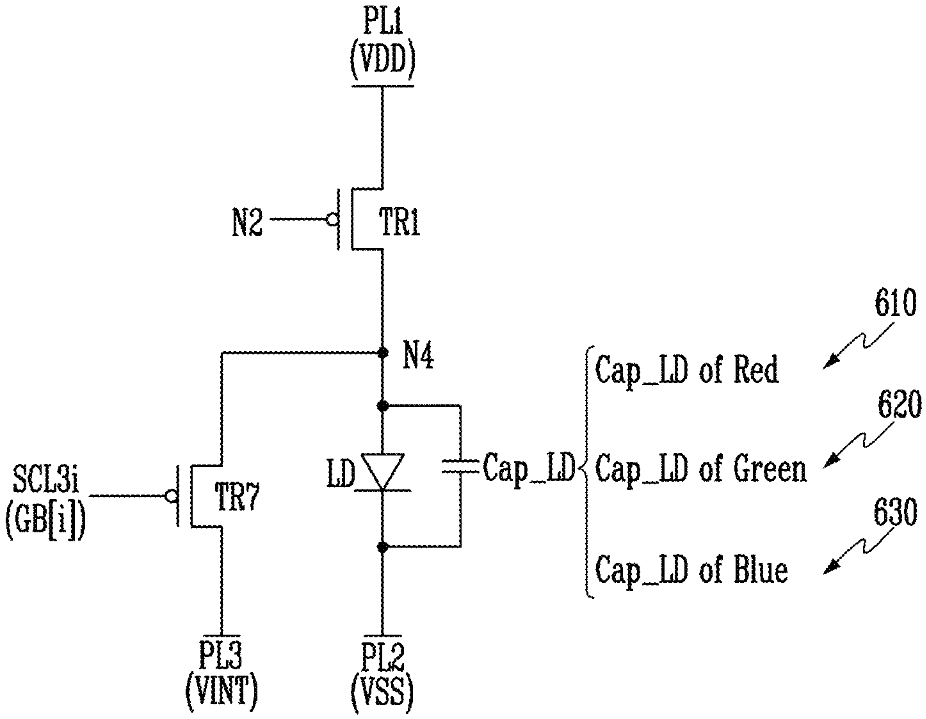
FIG. 6 is an equivalent circuit diagram for describing an example of capacitance according to a wavelength band of a light-emitting element.

FIG. 6 is an equivalent circuit diagram for describing differences in capacitance according to a wavelength band of light to be emitted by the light-emitting element LD.

Referring to FIG. 6, the light-emitting element LD and capacitance Cap_LD thereof is illustrated on the equivalent circuit. The light-emitting element LD may have a unique capacitance value based on the wavelength band of light being emitted. For example, the capacitance Cap_LD of the light-emitting element may vary according to the wavelength band of light emitted by the light-emitting element LD.

For example, each pixel PXL (e.g., see FIG. 1) according to embodiments of the present disclosure may include a red subpixel, a green subpixel, and a blue subpixel.

The red subpixel may include the light-emitting element LD that emits light in a red wavelength band. The red wavelength band may, for example, refer to visible light with a wavelength band of about 630 nanometers (nm) to 750 nm. The light-emitting element LD of the red subpixel may have first capacitance 610.

The green subpixel may include the light-emitting element LD that emits light in a green wavelength band. The green wavelength band may, for example, refer to visible light with a wavelength band of about 495 nm to about 570 nm. The light-emitting element LD of the green subpixel may have second capacitance 620.

The blue subpixel may include the light-emitting element LD that emits light in a blue wavelength band. The blue wavelength band may, for example, refer to visible light with a wavelength band of about 450 nm to about 495 nm. The light-emitting element LD of the blue subpixel may have third capacitance 630.

Any one of the first capacitance 610, the second capacitance 620, and the third capacitance 630 may be different from the other two. For example, the second capacitance 620 may have a larger value than the first and third capacitances 610 and 630. In this case, it may take a relatively longer time for the capacitance Cap_LD of the light-emitting element LD included in the green subpixel to be charged. Accordingly, when an image with a black gray scale tone (or a gray scale of 0) is displayed and then an image with a gray scale of more than 0 starts to be displayed, the red subpixel and the blue subpixel may emit light first (e.g., before emission of light from the green subpixel occurs) so that the light may be viewed as light with a magenta color by a user. This may be noticed as a color bleeding phenomenon by the user.

In addition, at low luminance, the magnitude of current flowing in the light-emitting element LD is relatively smaller. In this case, the color bleeding phenomenon may be more easily noticed. The color bleeding phenomenon degrades display quality. One or more embodiments described herein may solve the color bleeding phenomenon.

Figures 7, 8:
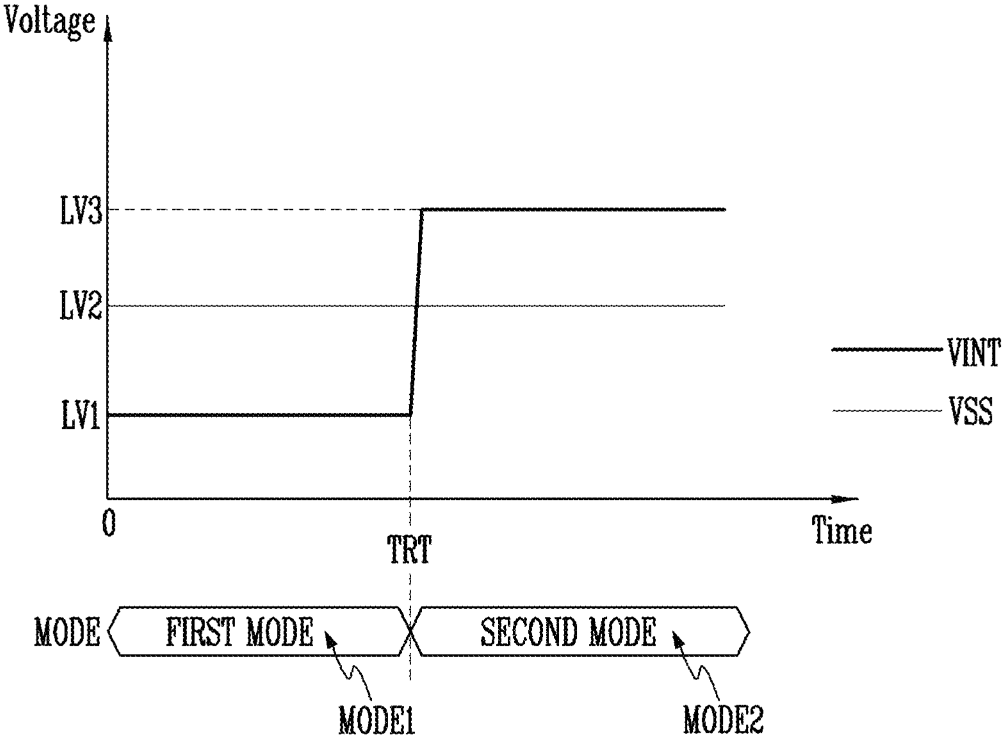
FIG. 7 is a diagram for describing that a level of an initialization voltage is changed according to modes according to an embodiment.
FIG. 8 is a table for describing that a level of a data signal with a black gray scale is changed according to modes according to an embodiment.

FIG. 7 is a diagram for describing that a level of an initialization voltage VINT is changed according to the mode of operation of the subpixels SP.

Referring to FIG. 7, in embodiments of the present disclosure, the level of the initialization voltage VINT may be changed according to a first mode MODE1 and a second mode MODE2. For example, in the first mode MODE1, the initialization voltage VINT may have a first level LV1, and in the second mode MODE2, the initialization voltage VINT may have a third level LV3. The first level LV1 may be lower than the third level LV3. The level of the second power voltage VSS may be the second level LV2. The second level LV2 may be higher than the first level LV1 and may be lower than the third level LV3.

The initialization voltage VINT may be changed from the first level LV1 to the third level LV3 at a mode conversion time TRT.

Accordingly, as the level of the initialization voltage VINT is increased from the first level LV1 to the third level LV3 in the second mode MODE2, the magnitude of the initialization voltage VINT applied to the above-described fourth node N4 (e.g., see FIG. 3) may be increased. Accordingly, the length of a period to charge a light-emitting element LD (e.g., see FIG. 3) may be shortened. In this way, a color-shifting (or color bleeding) phenomenon may be alleviated.

Meanwhile, such a change in mode (for example, a change from the first mode MODE1 to the second mode MODE2) may be applied while video is displayed. When a mode is changed while a still image is displayed, the change may be easily noticed by a user, thus display quality may be degraded. Therefore, when it is determined that a video is being played, a change to the second mode MODE2 may be optionally applied.

FIG. 8 is a table 800 for describing that a level of a data signal Vdata with a black gray scale is changed according to the operational mode of the subpixel SP.

As shown in FIG. 7, when the level of the initialization voltage VINT increases in a second mode MODE2, a data signal Vdata for displaying an image with a black gray scale (or a gray scale of 0) may also having a higher level of margin. For example, the magnitude of an additional margin may be about 0.3 volt (V). For example, in order to stably display an image with a black gray scale in a first mode MODE1, the data signal Vdata may, for example, have a value of 7.1 V. In order to stably display an image with a black gray scale in the second mode MODE2, the data signal Vdata may have a higher level of margin. In this case, the data signal Vdata may, for example, have a value of 7.4 V.

However, the above-described value of the data signal Vdata is merely an example for describing that, in order to display an image with a black gray scale in the second mode MODE2, a higher level of margin may exist as compared to when an image with a black gray scale is displayed in the first mode MODE1. Therefore, the embodiments of the present disclosure are not limited thereto.

Meanwhile, when the data signal Vdata having a higher voltage level is continuously applied to display an image with a black gray scale, power consumption may be increased. Therefore, in the first mode MODE1 in which a high level of margin is not used, the data signal Vdata with a lower level may be applied to display an image with a black gray scale.

Figure 9A:
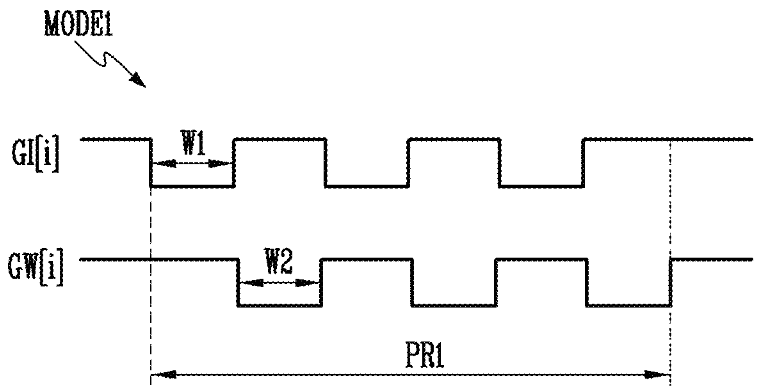
FIG. 9A is a diagram for describing a first scan signal and a second scan signal within a first period in a first mode according to an embodiment.
Figure 9B:
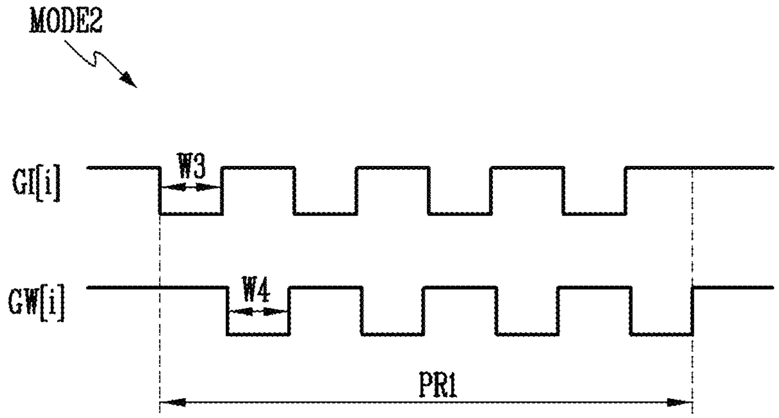
FIG. 9B is a diagram for describing the first scan signal and the second scan signal within the first period in a second mode according to an embodiment.

FIG. 9A is a diagram for describing the first scan signal GW[i] and the second scan signal GI[i] within a first period PR1 in a first mode MODE1 according to an embodiment. FIG. 9B is a diagram for describing the first scan signal GW[i] and the second scan signal GI[i] within the first period PR1 in a second mode MODE2 according to an embodiment.

Referring to FIGS. 9A and 9B, in each of the first mode MODE1 and the second mode MODE2, the first scan signal GW[i] and the second scan signal GI[i] may be toggled. In other words, each of the first scan signal GW[i] and the second scan signal GI[i] may alternately have a turn-on level and a turn-off level within the first period PR1.

The number of times which the first and second scan signals GW[i] and GI[i] are toggled in the second mode MODE2 may be greater than the number of times which the first and second scan signals GW[i] and GI[i] are toggled in the first mode MODE1. For example, in the first mode MODE2, each of the first and second scan signals GW[i] and GI[i] may be toggled three times. In the second mode MODE2, each of the first and second scan signals GW[i] and GI[i] may be toggled four times. However, the embodiments of the present disclosure are not limited thereto. For example, in the second mode MODE2, each of the first and second scan signals GW[i] and GI[i] may be toggled five or more times.

In the first mode MODE1, the length of a period during which the second scan signal GI[i] has a turn-on level may be a first width W1, and the length of a period during which the first scan signal GW[i] has a turn-on level may be a second width W2. In the second mode MODE2, the length of a period during which the second scan signal GI[i] has a turn-on level may be a third width W3, and the length of a period during which the first scan signal GW[i] has a turn-on level may be a fourth width W4.

In one embodiment, lengths of the first width W1 and the second width W2 may be equal. However, the embodiments of the present disclosure are not limited thereto.

In one embodiment, lengths of the first width W1 and the third width W3 may be equal. Lengths of the second width W2 and the fourth width W4 may be equal. In the above embodiment, the length of the first period PR1 in the first mode MODE1 may be less than a length of the first period PR1 in the second mode MODE2.

In one embodiment, the length of the first width W1 may be greater than a length of the third width W3. The length of the second width W2 may be greater than a length of the fourth width W4. In the above embodiment, the length of the first period PR1 in the first mode MODE1 and the length of the first period PR1 in the second mode MODE2 may be substantially equal to each other. In the above embodiment, in each of the first mode MODE1 and the second mode MODE2, the total length of the period during which the first scan signal GW[i] has a turn-on level may be maintained to be equal. Similarly, in each of the first mode MODE1 and the second mode MODE2, the total length of the period during which the second scan signal GI[i] has a turn-on level may be maintained to be equal.

Referring again to FIG. 3, in embodiments of the present disclosure, in the first mode MODE1, an on-bias voltage may be applied to the driving transistor TR1 (which are for supplying a driving current to a light-emitting element LD) a first number of times (for example, three times. In the second mode MODE2, an on-bias voltage may be applied to the driving transistor TR1 a second number of times (for example, four or five times) that is more than the first number of times.

According to embodiments of the present disclosure, in the second mode MODE2, more on-bias voltage may be applied to the above-described first (driving) transistor TR1 (e.g., see FIG. 3). Thus, the shift of a current-voltage characteristic curve due to a hysteresis characteristic of the first transistor TR1 may be more effectively alleviated. Accordingly, the length of time for the light-emitting element LD (e.g., see FIG. 3) to be charged may be shortened. For the reasons described above, a color bleeding phenomenon may be improved.

However, when an image with luminance exceeding a threshold value is displayed, a charging speed of the light-emitting element LD (see FIG. 3) may become faster when an on-bias voltage is repeatedly applied to the first (driving) transistor TR1 (see FIG. 3). Thus, luminance may partially increase. Such a phenomenon may be referred to as a ghost phenomenon. Visibility may be degraded when a ghost phenomenon occurs. Therefore, when an image having a luminance of a threshold value or less is displayed, the second mode MODE2 may be optionally applied.

Figure 10:
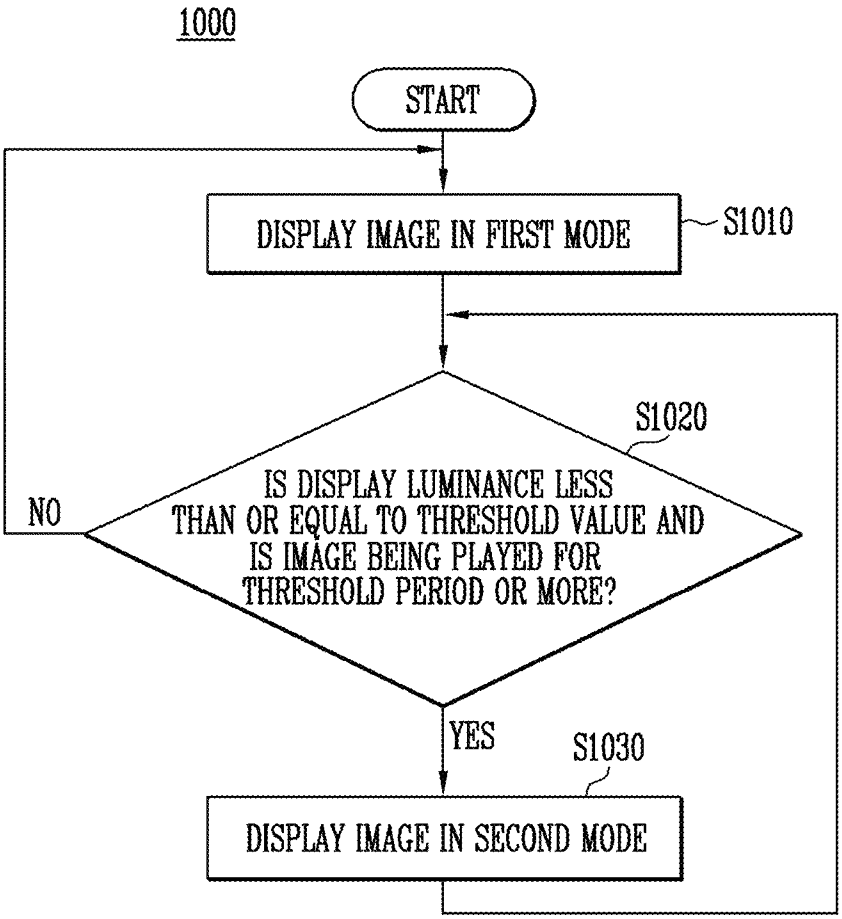
FIG. 10 is an example of a method of driving a display device according to embodiments of the present disclosure.

FIG. 10 is an example of a method 1000 of driving a display device according to embodiments of the present disclosure.

The method 100 of driving a display device according to embodiments of the present disclosure may include displaying an image in a first mode (S1010), determining whether display luminance is less than or equal to a threshold value and an image is being played for a threshold period or more (S1020), and displaying an image in a second mode (S1030).

When it is determined that the display luminance is less than or equal to the threshold value and the image is being played for the threshold period of time or more, displaying the image in the second mode (S1030) may be performed.

When it is determined that the display luminance is greater than or equal to the threshold value, or the image is not being played for the threshold period or more, displaying the image in the first mode (S1010) may be performed. The image being displayed for the threshold period or more may indicate that a video, rather than a still image, is being displayed for the threshold period of time or more.

Figure 11:
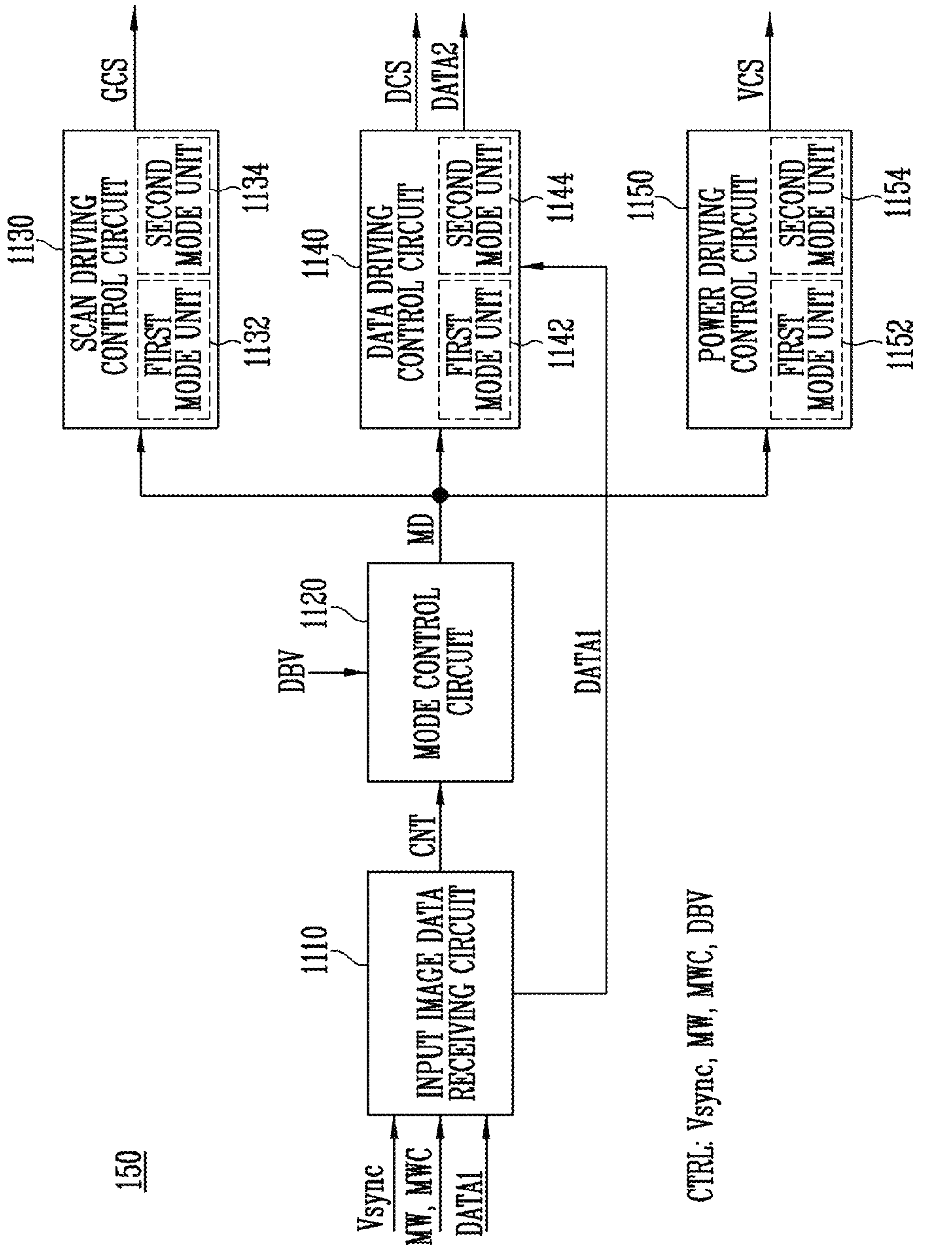
FIG. 11 is a system block diagram of a controller according to embodiments of the present disclosure.

FIG. 11 is a system block diagram of the controller 150 according to embodiments of the present disclosure.

Referring to FIG. 11, the controller 150 according to embodiments of the present disclosure may include an input image data receiving circuit 1110, a mode control circuit 1120, a scan driving control circuit 1130, a data driving control circuit 1140, and a power driving control circuit 1150.

The input image data receiving circuit 1110 may receive a vertical synchronization signal Vsync, a memory write signal MW, a memory write sustain signal MWC, and input image data DATA1. The vertical synchronization signal Vsync may be a signal that indicates the start of a next frame. The memory write signal MW may be a signal indicating that the input image data DATA1 to be displayed in the next frame is received. The memory write sustain signal MWC may be input after the memory write signal MW and may indicate that the input image data DATA1 of the next frame is continuously being input. The input image data DATA1 may correspond to an image to be displayed in the next frame.

The input image data receiving circuit 1110 may generate the above-described tearing signal TE (e.g., see FIG. 5) based on the vertical synchronization signal Vsync. The input image data receiving circuit 1110 may generate a count value CNT based on the memory write signal MW and the memory write sustain signal MWC.

The count value CNT is a value generated based on the tearing signal TE and the memory write signal MW and corresponds to the number of frames in which the input image data DATA1 is continuously written. For example, when it is determined that the input image data DATA1 is continuously input for a period of N frames or more (e.g., N is an integer of 2 or more) based on the vertical synchronization signal Vsync and the memory write signal MW, the input image data receiving circuit 1110 may output the count value CNT corresponding to N.

The mode control circuit 1120 may receive the count value and a luminance control signal DBV. The luminance control signal DBV may be a signal for controlling the luminance of light to be emitted for an image displayed on a display device 100 (e.g., see FIG. 1). The luminance control signal DBV may be input from an external system (for example, a host system). Based on the luminance control signal DBV, images with the same gray scale may be displayed at different luminances.

The mode control circuit 1120 may determine whether the value of the luminance control signal DBV is less than or equal to a threshold value and the count value CNT is greater than or equal to the threshold value, and may output a mode indicator signal MD according to a determination result. The mode indicator signal MD may have a level (for example, a low level) indicating a first mode or a level (for example, a high level) indicating a second mode.

The scan driving control circuit 1130 may include a first mode unit (or first mode circuit) 1132 and a second mode unit (second mode circuit) 1134. The scan driving control circuit 1130 may receive the mode indicator signal MD and may operate one of the first mode unit (first mode circuit) 1132 and the second mode unit (or second mode circuit) 1134 in response to the received mode indicator signal MD, to output a gate control signal GCS. The gate control signal GCS may include clock signals.

In one embodiment, referring to FIGS. 9A and 9B described above, the number of times by which a first scan signal GW[i] and a second scan signal GI[i] are toggled in a first period PR1 may be controlled according to the clock signal included in the gate control signal GCS. As one technical method to achieve this, the following method may be considered.

For example, the gate control signal GCS may include a start signal and clock signals. The start signal may be a signal input to the most preceding (e.g., first) shift register of a gate driving circuit 120 (see FIG. 1). Following shift registers may receive carry signals generated by the start signal. In one embodiment, by controlling the number of pulses included in the start signal, first and second scan signals GW[i] and GI[i]) may be output to have the same number of pulses.

In the above embodiment, the first mode unit 1132 may output a start signal including one or more pulses (for example, three pulses) as shown in FIG. 9A. The second mode unit 1134 may output a start pulse including two or more pulses (for example, four pulses) as illustrated in FIG. 9B. However, the embodiments of the present disclosure are not limited thereto, and the number of pulses included in the first and second scan signals GW[i] and GI[i] may be controlled differently in various ways according to the design of a person skilled in the art.

According to the clock signal included in the gate control signal GCS, the length of a period during which the first scan signal GW[i] and the second scan signal GI[i] have turn-on levels in the first period PR1 may be controlled.

The data driving control circuit 1140 may include a first mode unit (or first mode circuit) 1142 and a second mode unit 1144 (or second mode circuit). The data driving control circuit 1140 may receive the mode indicator signal MD and the input image data DATA1 and may operate one of the first mode unit 1142 or the second mode unit 1144 in response to the received mode indicator signal MD, to thereby output a data control signal DCS and image data DATA2. In one embodiment, values of image data DATA2 for displaying an image with a black gray scale the first mode unit 1142 and the second mode unit 1144 may be different.

The power driving control circuit 1150 may include a first mode unit (or first mode circuit) 1152 and a second mode unit 1154 (or second mode circuit). The power driving control circuit may receive the mode indicator signal MD and may operate one of the first mode unit 1152 or the second mode unit 1154 in response to the received mode indicator signal MD, to thereby output a voltage control signal VCS. Referring to FIG. 7 described above, the level of the initialization voltage VINT may transition from a first level LV1 to a third level LV3 by the voltage control signal VCS. Referring to FIGS. 1 and 8 described above, a gamma voltage Vgamma may be changed by the voltage control signal VCS, to adjust a data signal Vdata for displaying an image with a black gray scale.

The vertical synchronization signal Vsync, the memory write signal MW, the memory write sustain signal MWC, and the luminance control signal DBV may be included in the control signal CTRL.

Figure 12:
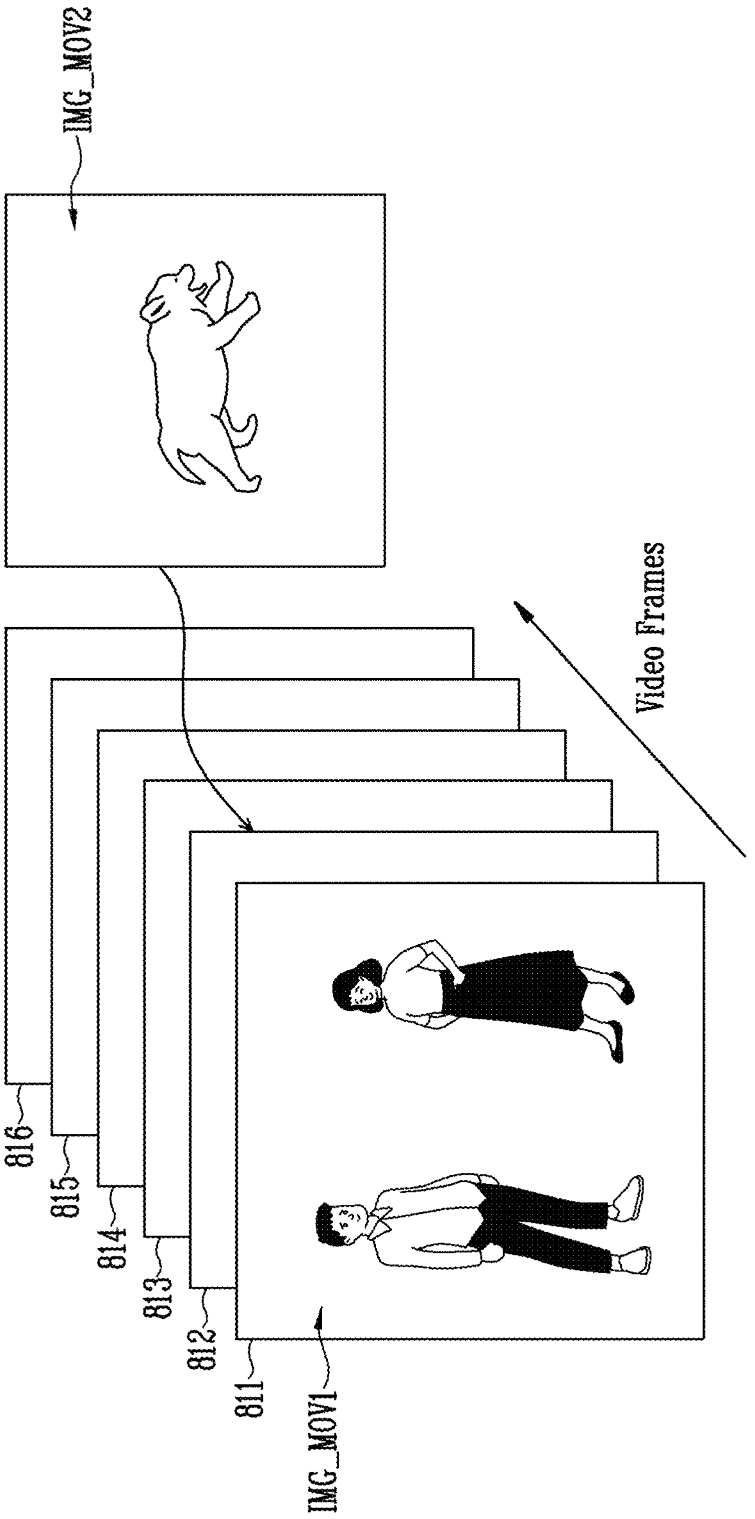
FIG. 12 is a diagram for describing frames in which a video is displayed.

FIG. 12 is a diagram for describing an example of frames in which a video is displayed. The video may include a plurality of frames 811 to 816. An image may be displayed in each of the plurality of frames. For example, a first image IMG_MOV1 may be displayed in a first frame 811, and a second image IMG_MOV2 may be displayed in a subsequent second frame 812. As compared to a still image, the video may refer to a video in which an image displayed in each frame changes while the plurality of frames 811 to 816 progress.

Figure 13:
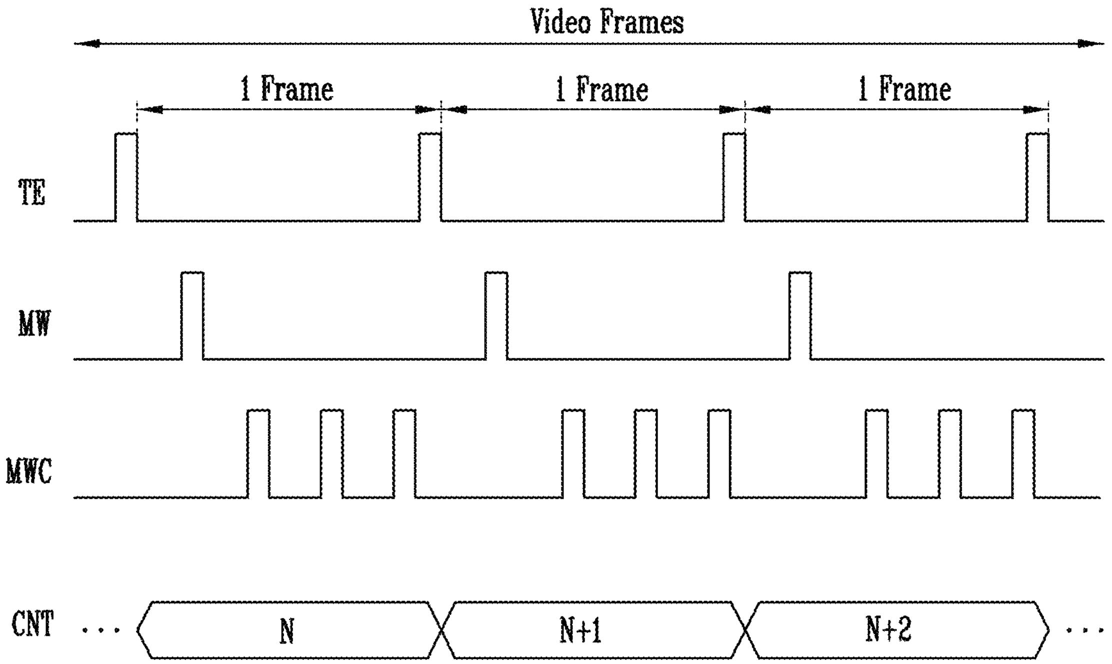
FIG. 13 is a timing diagram illustrating a tearing signal, a memory write signal, a memory write sustain signal, and a count value.

FIG. 13 is a timing diagram illustrating a tearing signal TE, a memory write signal MW, a memory write sustain signal MWC, and a count value CNT according to an embodiment. Within a period during which a video is displayed, three frames indicated by the tearing signal TE are shown as an example. One memory write signal MW may be input within each frame period. One or more memory write sustain signals MWC may be input subsequent to the memory write signal MW.

The count value CNT may be calculated based on the tearing signal TE and the memory write signal MW. For example, in the first frame determined by the tearing signal TE, the count value CNT may be N. In the next frame, the count value CNT can be increased to N+1. In the next frame, the count value CNT may be increased to N+2. When the count value CNT is greater than or equal to a threshold value, it may be determined that an image (for example, a video) is being played for a threshold period of time or more.

Figure 14A:
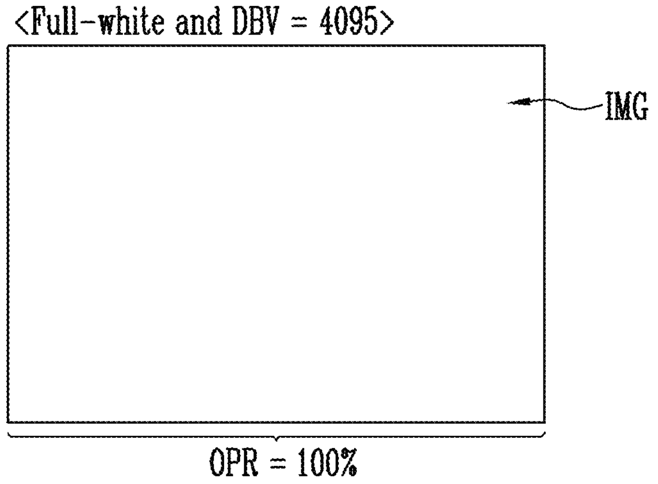
FIGS. 14A to 14C are diagrams for describing a change in luminance according to a luminance control signal according to an embodiment.
Figure 14B:
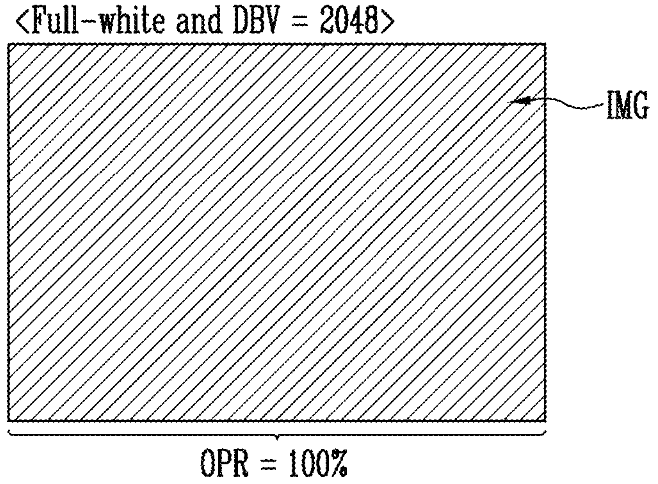
Figure 14C:
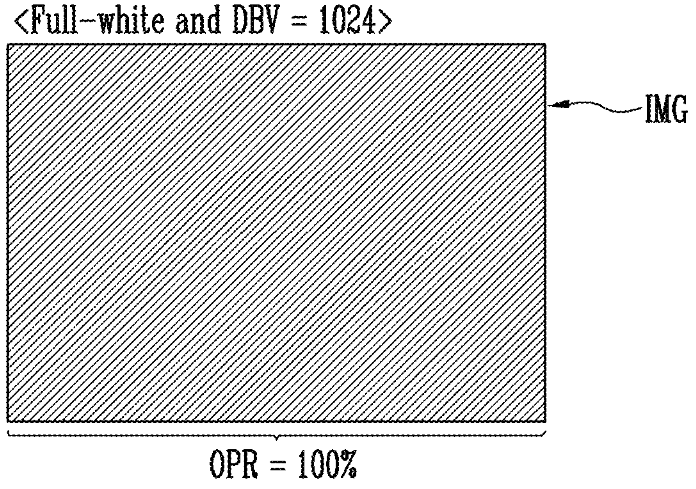

FIGS. 14A to 14C are diagrams for describing a change in luminance according to a luminance control signal DBV, according to an embodiment. For convenience of description, a case in which an image with a full-white gray scale is displayed will be described as an example. When the image with a full-white gray scale is displayed, all pixels PXL (see FIG. 1) may emit light. Thus, an on-pixel ratio (OPR) in the image with a full-white gray scale may be 100%.

Referring to FIGS. 14A to 14C, images IMG are displayed. The images IMG may all be images with a full-white gray scale and may be images in which only luminances are applied differently according to a luminance control signal DBV. In one embodiment, the value of the luminance control signal DBV may in a predetermined range, e.g., 0 to 4,095. However, the embodiments of the present disclosure are not limited thereto, e.g., may be in a different predetermined range.

Referring to FIG. 14A, an embodiment in which the value of the luminance control signal DBV is 4,095 is shown. In the above embodiment, an image with a full-white gray scale may be displayed at maximum luminance.

Referring to FIG. 14B, an embodiment in which the value of the luminance control signal DBV is 2,048 is shown. In the above embodiment, an image with a full-white gray scale may be displayed at half luminance as compared to FIG. 14A.

Referring to FIG. 14C, an embodiment in which the value of the luminance control signal DBV is 1,024 is shown. In the above embodiment, an image with a full-white gray scale may be displayed at half luminance as compared to FIG. 14B.

Thus, the luminance of an image may be variably controlled by the luminance control signal DBV.

In one embodiment, a threshold value of display luminance for displaying an image in a second mode may be a predetermined value, e.g., about 2 nits. In one embodiment, a threshold value of display luminance for displaying an image in a second mode may correspond to luminance indicated by a minimum value (for example, 1) that is greater than 0 of the luminance control signal DBV.

Figure 15:
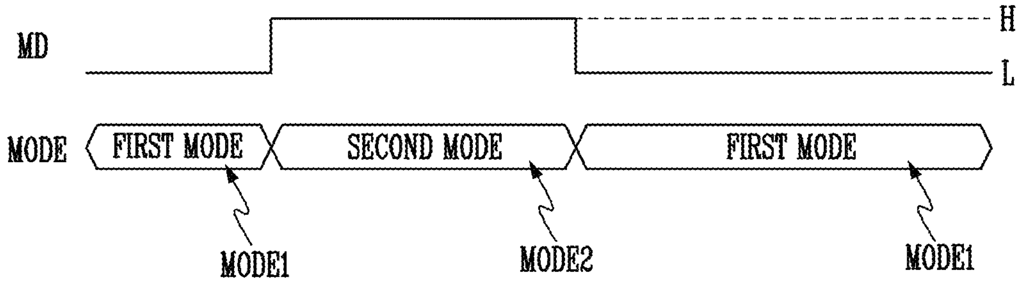
FIG. 15 is a diagram illustrating a mode indicator signal and a mode change according to the mode indicator signal according to embodiments of the present disclosure.

FIG. 15 is a diagram illustrating a mode indicator signal MD and a mode change according to the mode indicator signal MD according to embodiments of the present disclosure.

Referring to FIG. 15, the mode indicator signal MD may have signal levels that respectively indicate a first mode MODE1 and a second mode MODE2. For example, the mode indicator signal MD may have a first level (for example, a low level L) to indicate the first mode MODE1. For example, the mode indicator signal MD may have a second level (for example, a high level H) to indicate the second mode MODE2. Accordingly, a display device 100 (see FIG. 1) according to embodiments of the present disclosure may be operated by selecting one of the first mode MODE1 or the second mode MODE2.

Figure 16:
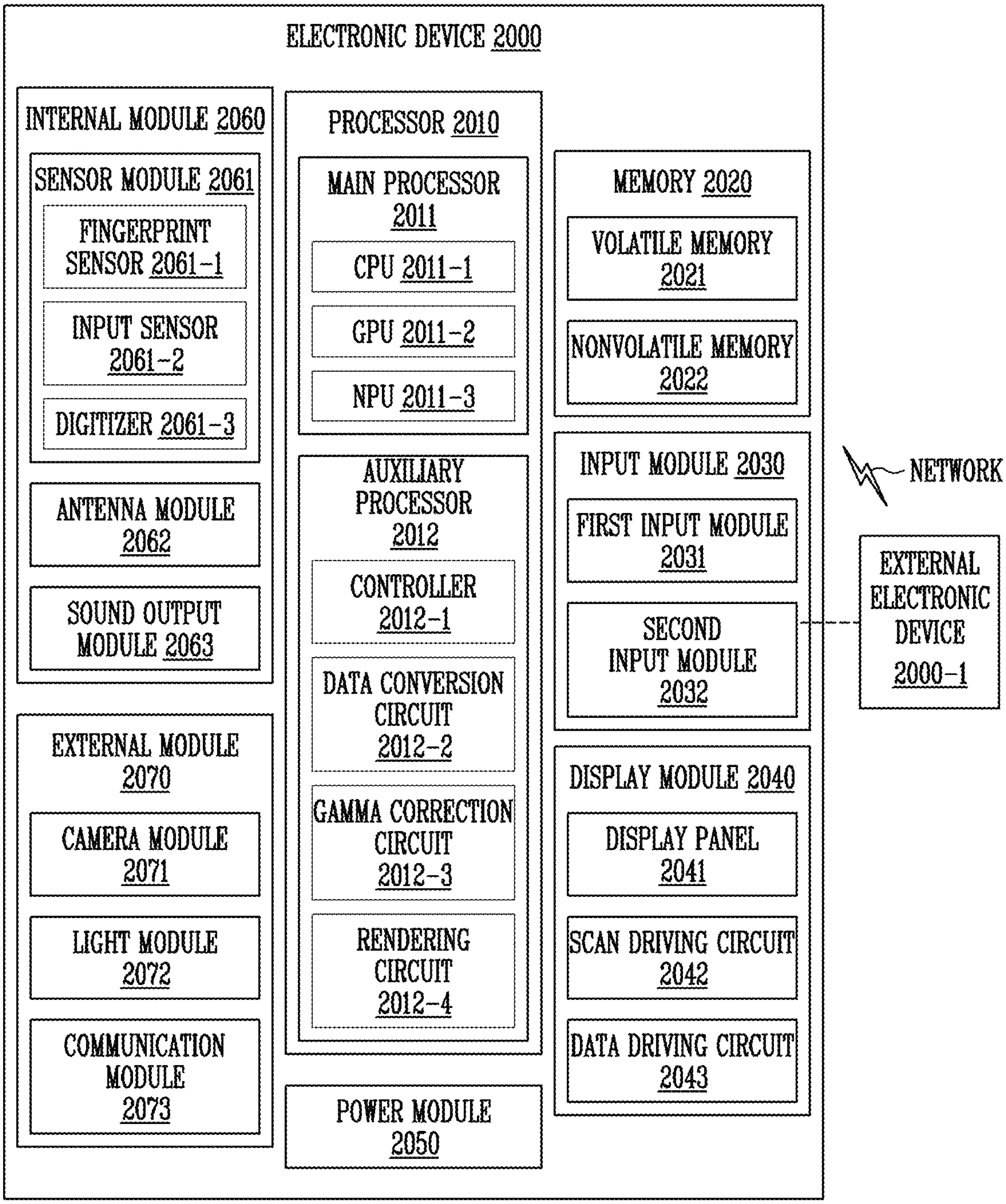
FIG. 16 is a block diagram of an electronic device according to embodiments of the disclosure.

FIG. 16 is a block diagram of an electronic device 2000 according to embodiments of the disclosure.

The electronic device 2000 may output various pieces of information through a display module 2040 in an operating system. When the processor 2010 executes an application stored in the memory 2020, the display module 2040 may provide application information to a user of the electronic device 2000 through a display panel 2041.

As another example, when personal information authentication is executed in the display module 2040, a fingerprint sensor 2061-1 may obtain input fingerprint information as input data. The processor 2010 may compare input data obtained through the fingerprint sensor 2061-1 with authentication data stored in the memory 2020 and execute an application according to a comparison result. The display module 2040 may display information executed according to a logic of the application through the display panel 2041.

As still another example, when a music streaming icon displayed on the display module 2040 is selected, the processor 2010 may obtain a user input through an input sensor 2061-2 and activate a music streaming application stored in the memory 2020. When a music execution command is input in the music streaming application, the processor 2010 may activate a sound output module 2063 to provide sound information corresponding to the music execution command to the user.

In the above, an operation of the electronic device 2000 is briefly described. Hereinafter, a configuration of the electronic device 2000 is described in more detail. Some of configurations of the electronic device 2000 to be described later may be integrated and provided as one configuration, and one configuration may be separated into two or more configurations and provided.

Referring to FIG. 16, the electronic device 2000 may communicate with an external electronic device 2000-1 through a network (for example, a short-range wireless communication network or a long-range wireless network). According to an embodiment, the electronic device 2000 may include a processor 2010, a memory 2020, an input module 2030, a display module 2040, a power module 2050, an internal module 2060, an external module 2070, and the like. According to an embodiment, in the electronic device 2000, at least one of the above-described components may be omitted or one or more other components may be added. According to an embodiment, some of the above-described components (for example, the sensor module 2061, an antenna module 2062, the sound output module 2063, and the like) may be integrated into another component (for example, the display module 2040).

The processor 2010 may execute software to control at least another component (for example, a hardware or software component) of the electronic device 2000 connected to the processor 2010, and perform various data processing or operations. According to an embodiment, as at least a portion of the data processing or operation, the processor 2010 may store a command or data received from another component (for example, the input module 2030, the sensor module 2061, or a communication module 2073) in a volatile memory 2021 and process the command or the data stored in the volatile memory 2021. The processed result data may be stored in a nonvolatile memory 2022.

The processor 2010 may include a main processor 2011 and an auxiliary processor 2012. The main processor 2011 may include at least one of a central processing unit ("CPU") 2011-1 or an application processor ("AP"). The main processor 2011 may further include one or more of a graphic processing unit ("GPU") 2011-2, a communication processor ("CP"), and an image signal processor ("ISP"). The main processor 2011 may further include a neural processing unit ("NPU") 2011-3. The NPU 2011-3 is a processor specialized in processing an artificial intelligence model, and the artificial intelligence model may be generated through machine learning. The artificial intelligence model may include a plurality of artificial neural network layers. The artificial neural network may be a deep neural network ("DNN"), a convolutional neural network ("CNN"), a deep belief network ("DBN"), a bidirectional recurrent deep neural network ("BRDNN"), a deep Q-network, or a combination of two or more of the above. However, embodiments of the disclosure are not limited to that described above. Additionally or alternatively, the artificial intelligence model may include a software structure in addition to a hardware structure. At least two of the above-described processing units and processors may be implemented as one integrated configuration (for example, a single chip), or each may be configured as an independent configuration (for example, a plurality of chips). The main processor 2011 may include the host system described above. The main processor 2011 may output at least one of the vertical synchronization signal Vsync, memory write signal MW, memory write sustain signal MWC, input image data DATA1, and the luminance control signal DBV (refer to FIG. 11).

The auxiliary processor 2012 may include a controller 2012-1. The controller 2012-1 may include an interface conversion circuit and the controller 150 (refer to FIG. 1). The controller 2012-1 may receive an image signal from the main processor 2011, convert a data format of the image signal to correspond to an interface specification with the display module 2040, and output image data. The controller 2012-1 may output various control signals required for driving the display module 2040.

The auxiliary processor 2012 may further include a data conversion circuit 2012-2, a gamma correction circuit 2012-3, a rendering circuit 2012-4, and the like.

The data conversion circuit 2012-2 may receive the image data from the controller 2012-1, compensate the image data to display an image with a desired luminance according to a characteristic of the electronic device 2000, a setting of the user, or the like, or convert the image data for reduction of power consumption, afterimage compensation, or the like.

The gamma correction circuit 2012-3 may convert the image data, a gamma reference voltage, or the like so that the image displayed on the electronic device 2000 has a desired gamma characteristic. The rendering circuit 2012-4 may receive the image data from the controller 2012-1 and render the image data in consideration of a pixel disposition or the like of the display panel 2041 applied to the electronic device 2000. At least one of the data conversion circuit 2012-2, the gamma correction circuit 2012-3, and the rendering circuit 2012-4 may be integrated into another component (for example, the main processor 2011 or the controller 2012-1). At least one of the data conversion circuit 2012-2, the gamma correction circuit 2012-3, and the rendering circuit 2012-4 may be integrated into a data driving circuit 2043 to be described later.

The memory 2020 may store various data used by at least one component (for example, the processor 2010 or the sensor module 2061) of the electronic device 2000, and input data or output data for a command related thereto. The memory 2020 may include at least one of the volatile memory 2021 and the nonvolatile memory 2022.

The input module 2030 may receive a command or data to be used by a component (for example, the processor 2010, the sensor module 2061, the sound output module 2063, or the like) of the electronic device 2000 from an outside (for example, the user or the external electronic device 2000-1) of the electronic device 2000.

The input module 2030 may include a first input module 2031 configured to receive a command or data input from the user and a second input module 2032 configured to receive a command or data input from the external electronic device 2000-1. The first input module 2031 may include at least one of a microphone, a mouse, a keyboard, a key (for example, a button or the like), and a pen (for example, a passive pen or an active pen). The second input module 2032 may support a designated protocol capable of connecting to the external electronic device 2000 by wire or wirelessly. According to an embodiment, the second input module 2032 may include at least one of a high-definition multimedia interface ("HDMI"), a universal serial bus ("USB") interface, a secure digital ("SD") card interface, and an audio interface. The second input module 2032 may include a connector capable of physically connecting the electronic device 2000 to the external electronic device 2000-1, for example, an HDMI connector, a USB connector, an SD card connector, an audio connector (for example, a headphone connector), or the like.

The display module 2040 may visually provide information to the user of the electronic device 2000. The display module 2040 may include a display panel 2041, a scan driving circuit 2042, and the data driving circuit 2043. The display module 2040 may further include a window, a chassis, a bracket, and the like for protecting the display panel 2040.

The display panel 2041 may include a liquid crystal display panel, an organic light emitting display panel, an inorganic light emitting display panel, or the like. A type of the display panel 2041 is not particularly limited. The display panel 2041 may be a rigid type. The display panel 2041 may be a flexible type that may be rolled, folded, or stretchable. The display module 2040 may further include a supporter that supports the display panel 2041, a bracket, a heat dissipation member, or the like. The display panel 2041 may correspond to the display panel 110 (refer to FIG. 1) described above.

In an embodiment, the scan driving circuit 2042 may be mounted on the display panel 2041 as a driving chip. In another embodiment, the scan driving circuit 2042 may be integrated into the display panel 2041. For example, the scan driving circuit 2042 may include an amorphous silicon thin film transistor ("TFT") gate driver circuit ("ASG"), a low temperature polycrystalline silicon ("LTPS") TFT gate driver circuit, an oxide semiconductor TFT gate driver circuit ("OSG"), or the like built in the display panel 2041. The scan driving circuit 2042 may receive a control signal from the controller 2012-1 and output a scan signal to the display panel 2041 in response to the control signal. The scan driving circuit 2042 may correspond to the scan driving circuit 120 (refer to FIG. 1).

In an embodiment, the display module 2040 may further include an emission driving circuit. The emission driving circuit may output an emission control signal to the display panel 2041 in response to a control signal received from the controller 2012-1. The emission driving circuit may be distinguished from the scan driving circuit 2042, or may be integrated into the scan driving circuit 2042.

The data driving circuit 2043 may receive a control signal from the controller 2012-1 and convert image data into an analog voltage (for example, a data voltage) in response to the received control signal. The data driving circuit 2043 may output the converted data voltage to the display panel 2041. The data driving circuit 2043 may receive the control signal from the controller 2012-1 and sense sub-pixels disposed in the display panel 2041 in response to the received control signal. The data driving circuit 2043 may sense sub-pixels and output digital values corresponding to the sensing values obtained. The data driving circuit 2043 may correspond to the data driving circuit 130 (refer to FIG. 1) described above.

The data driving circuit 2043 may be integrated with another component (for example, the controller 2012-1) of the electronic device 2000. An interface conversion circuit of the controller 2012-1 and at least a portion of a function of the controller 150 (refer to FIG. 1) may be integrated into the data driving circuit 2043.

The display module 2040 may further include a power supply circuit. The power supply circuit may output various voltages required to drive the display panel 2041. For example, the power supply circuit may correspond to the power supply circuit 140 (refer to FIG. 1) described above.

The power module 2050 may supply power to a component of the electronic device 2000. The power module 2050 may include a battery that charges a power voltage. The battery may include a non-rechargeable primary cell, and a rechargeable secondary cell or fuel cell. The power module 2050 may include a power management integrated circuit ("PMIC"). The PMIC may supply optimized power to each of the above-described module and a module to be described later. The power module 2050 may include a wireless power transmission/reception member electrically connected to the battery. The wireless power transmission/reception member may include a plurality of antenna radiators of a coil form.

The electronic device 2000 may include an internal module 2060 and an external module 2070. The internal module 2060 may include a sensor module 2061, an antenna module 2062, and the sound output module 2063. The external module 2070 may include a camera module 2071, a light module 2072, and the communication module 2073.

The sensor module 2061 may sense an input by a body of the user or an input by a pen among the first input module 2031. The sensor module 2061 may generate an electrical signal or a data value corresponding to the input. The sensor module 2061 may include at least one of a fingerprint sensor 2061-1, an input sensor 2061-2, and a digitizer 2061-3.

The fingerprint sensor 2061-1 may generate a data value corresponding to a user's fingerprint. In an embodiment, the fingerprint sensor 2061-1 may include one of an optical type, capacitive type, and ultrasonic type fingerprint sensors. However, embodiments of the disclosure are not limited thereto.

The input sensor 2061-2 may generate a data value corresponding to coordinate information of the input by the body of the user or the pen. The input sensor 2061-2 may generate a change amount of a capacitance by the input as the data value. The input sensor 2061-2 may sense an input by the passive pen or may transmit/receive data to and from the active pen.

The input sensor 2061-2 may measure a biometric signal such as blood pressure, water, or body fat. For example, when the user touches a sensor layer or a sensing panel with a body part and does not move during a certain time, the input sensor 2061-2 may sense the biometric signal based on a change of an electric field by the body part. Accordingly, information on the sensed biometric signal desired by the user may be output to the display module 2040.

The digitizer 2061-3 may generate a data value corresponding to coordinate information of the input by the pen. The digitizer 2061-3 may generate an electromagnetic change amount by the input as the data value. The digitizer 2061-3 may sense the input by the passive pen or may transmit/receive data to and from the active pen.

In an embodiment, at least one of the fingerprint sensor 2061-1, the input sensor 2061-2, and the digitizer 2061-3 may be implemented as the sensor layer formed on the display panel 2041 through a continuous steps. At least one of the fingerprint sensor 2061-1, the input sensor 2061-2, and the digitizer 2061-3 may be disposed above the display panel 2041. One (for example, the digitizer 2061-3) of the fingerprint sensor 2061-1, the input sensor 2061-2, and the digitizer 2061-3 may be disposed below the display panel 2041.

At least two of the fingerprint sensor 2061-1, the input sensor 2061-2, and the digitizer 2061-3 may be formed to be integrated into one sensing panel through the same process. In an embodiment, when at least two of the fingerprint sensor 2061-1, the input sensor 2061-2, and the digitizer 2061-3 are integrated into one sensing panel, the sensing panel may be disposed between the display panel 2041 and a window disposed above the display panel 2041. However, embodiments of the disclosure are not limited thereto. The sensing panel may be disposed on the window, and a position of the sensing panel is not particularly limited.

At least one of the fingerprint sensor 2061-1, the input sensor 2061-2, and the digitizer 2061-3 may be embedded in the display panel 2041. At least one of the fingerprint sensor 2061-1, the input sensor 2061-2, and the digitizer 2061-3 may be simultaneously formed through a process of forming elements (for example, a light emitting element, a transistor, a capacitor, and the like) included in the display panel 2041.

In addition, the sensor module 2061 may generate an electrical signal or a data value corresponding to an internal state or an external state of the electronic device 2000. The sensor module 2061 may further include, for example, at least one of a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, a humidity sensor, and an illuminance sensor.

The antenna module 2062 may include one or more antennas for transmitting a signal or power to an outside or receiving a signal or power. According to an embodiment, the communication module 2062 may transmit a signal to an external electronic device or receive a signal from the external electronic device 2000-1 or receive a signal from the external electronic device 2000-1 through an antenna suitable for a communication method. An antenna pattern of the antenna module 2062 may be integrated into one configuration (for example, the display panel 2041) of the display module 2040, the input sensor 2061-2, or the like.

The sound output module 2063 may be configured to output a sound signal to an outside of the electronic device 2000. For example, the sound output module 2063 may include a speaker used for general purposes such as multimedia playback or recording playback, and a receiver used exclusively for receiving a call. According to an embodiment, the receiver may be formed integrally with or separately from the speaker. A sound output pattern of the sound output module 2063 may be integrated into the display module 2040.

The camera module 2071 may capture a still image and a moving image. According to an embodiment, the camera module 2071 may include one or more lenses, an image sensor, or an image signal processor. The camera module 2071 may further include an infrared camera capable of measuring presence or absence of the user, a position of the user, a gaze of the user, or the like.

The light module 2072 may provide light. The light module 2072 may include a light emitting diode or a xenon (Xe) lamp. The light module 2072 may operate in conjunction with the camera module 2071 or may operate independently.

The communication module 2073 may support establishment of a wired or wireless communication channel between the electronic device 2000 and the external electronic device 2000-1, and performance of communication through the established communication channel. In an embodiment, communication module 2073 may include a wireless communication module and/or a wired communication module. The wireless communication module may include, for example, a cellular communication module, a short-range communication module, a global navigation satellite system ("GNSS") communication module, or the like. The wired communication module may include, for example, a local area network ("LAN") communication module, a power line communication module, or the like. The communication module 2073 may communicate with the external electronic device 2000-1 through a short-range communication network or a long-range communication network. The short-range communication network may include, for example, Bluetooth®, wireless fidelity ("Wi-Fi") direct, infrared data association ("IrDA"), or the like. The long-range communication network may include a computer network such as a LAN or wide area network ("WAN"). The communication module 2073 described above may be implemented as one chip, or may be implemented as separate chips.

The input module 2030, the sensor module 2061, the camera module 2071, and the like may be used to control an operation of the display module 2040 in conjunction with the processor 2010.

The processor 2010 may output a command or data to the display module 2040, the sound output module 2063, the camera module 2071, or the light module 2072 based on input data received from the input module 2030. For example, the processor 2010 may generate image data in response to the input data applied through a mouse, an active pen, or the like and output the image data to the display module 2040, or generate command data in response to the input data and output the command data to the camera module 2071 or the light module 2072. When the input data is not received from the input module 2030 during a certain time, the processor 2010 may convert an operation mode of the electronic device 2000 to a low power mode or a sleep mode to reduce power consumed in the electronic device 2000.

The processor 2010 may output a command or data to the display module 2040, the sound output module 2063, the camera module 2071, or the light module 2072 based on sensing data received from the sensor module 2061. For example, the processor 2010 may compare authentication data applied by the fingerprint sensor 2061-1 with authentication data stored in the memory 2020 and then execute an application according to a comparison result. The processor 2010 may execute the command based on sensing data sensed by the input sensor 2061-2 or the digitizer 2061-3 or output corresponding image data to the display module 2040. When the sensor module 2061 includes a temperature sensor, the processor 2010 may receive temperature data for a measured temperature from the sensor module 2061 and further perform luminance correction or the like on the image data based on the temperature data.

The processor 2010 may receive measurement data for the presence of the user, the position of the user, the gaze of the user, and the like, from the camera module 2071. The processor 2010 may further perform luminance correction or the like on the image data based on the measurement data. For example, the processor 2010 determining the presence or absence of the user through an input from the camera module 2071 may output image data of which a luminance is corrected through the data conversion circuit 2012-2 or the gamma correction circuit 2012-3 to the display module 2040.

Some of the components of the electronic device 2000 may be connected to each other through a communication method between peripheral devices, for example, a bus, general purpose input/output ("GPIO"), a serial peripheral interface ("SPI"), a mobile industry processor interface ("MIPI"), or an ultra path interconnect ("UPI") link to exchange a signal (for example, a command or data) with each other. For example, the processor 1110 may communicate with the display module 2040 through a mutually agreed interface. To this end, one of the above-described communication methods may be adopted, but the communication method is not limited to that described above.

The electronic device 2000 according to embodiments of the disclosure may be various types of devices. For example, the electronic device 2000 may include at least one of a portable communication device (for example, a smart phone), a computer device, a portable multimedia device, a portable medical device, a camera, a wearable device, and a home appliance. However, the electronic device 2000 according to embodiments of the disclosure is not limited thereto.

According to embodiments of the present disclosure, there may be provided a controller capable of improving (e.g., offsetting) a color bleeding phenomenon, a display device including the same, an electronic device including the same, and a method of driving the display device.

The drawings and detailed description of the invention described so far are merely illustrative of the present disclosure and are merely intended to describe the present disclosure and are not intended to limit the meanings thereof or the scope of the present disclosure described in the accompanying claims. Therefore, those skilled in the art will appreciate that various modifications and other equivalent embodiments are possible from the embodiments. Therefore, the technical scope of the present disclosure should be defined by the technical spirit of the claims. The embodiments may be combined to form additional embodiments.

What is claimed is:

1. A controller comprising:

an input image data receiving circuit configured to receive input image data and generate a count value corresponding to a number of frames in which an image is continuously played, the count value being generated in response to a vertical synchronization signal indicating a start of a frame among the frames, a memory write signal indicating that the input image data of a next frame has been received, and a memory write sustain signal indicating that the input image data of the next frame is continuously received;

a mode control circuit configured to generate a mode indicator signal based on the count value and a luminance control signal;

a scan driving control circuit configured to output a gate control signal including a clock signal to control driving of gate lines of a display panel, based on the mode indicator signal; and a power driving control circuit configured to output a voltage control signal to control a level of a power voltage applied to the display panel, based on the mode indicator signal.

2. The controller of claim 1, wherein the input image data receiving circuit is configured to:

generate a tearing signal based on the vertical synchronization signal, and increase the count value when the memory write signal and the memory write sustain signal are input between periods in which the tearing signal is continuously input.

3. The controller of claim 1, wherein the mode control circuit is configured to determine whether the received count value is greater than or equal to a preset threshold value and the luminance control signal has a value that is less than or equal to the preset threshold value.

4. The controller of claim 3, wherein the threshold value of the luminance control signal is a minimum value that is greater than 0 among values of the luminance control signal.

5. The controller of claim 3, wherein the mode control circuit is configured to:

output the mode indicator signal to have a first level when the received count value is less than the preset threshold value, or the luminance control signal has a value that is greater than the preset threshold value, and output the mode indicator signal to have a second level when the received count value is greater than or equal to the preset threshold value and the luminance control signal has the value that is less than or equal to the preset threshold value.

6. The controller of claim 5, wherein:

the first level is a low level, and the second level is a high level.

7. The controller of claim 1, wherein the scan driving control circuit includes a first mode circuit and a second mode circuit, and the gate control signal includes a start signal, wherein the first mode circuit is configured to output the start signal having a first number of pulses in response to the mode indicator signal having a first level, and the second mode circuit is configured to output the start signal having a second number of pulses that is greater than the first number in response to the mode indicator signal having a second level.

8. The controller of claim 1, wherein the power driving control circuit includes a first mode circuit and a second mode circuit, wherein the first mode circuit is configured to output the voltage control signal to output the power voltage having a low voltage level in response to the mode indicator signal having a first level, and the second mode circuit is configured to output the voltage control signal to output the power voltage having a high voltage level in response to the mode indicator signal having a second level.

9. The controller of claim 8, wherein the first mode circuit is configured to output a gamma voltage to output a data signal having a black gray scale and a small margin, and the second mode circuit outputs the gamma voltage for outputting a data signal having a black gray scale and a large margin.

10. The controller of claim 1, further comprising:

a data driving control circuit configured to output a data control signal to control a level of a data signal applied to the display panel, based on the mode indicator signal.

11. The controller of claim 10, wherein:

the data driving control circuit includes a first mode circuit and a second mode circuit and is configured to receive the input image data, the first mode circuit is configured to output image data to generate a data signal having a black gray scale and a small margin based on the mode indicator signal having a first level and the input image data, and the second mode circuit is configured to output the image data to generate a data signal having a black gray scale and a large margin based on the mode indicator signal having a second level and the input image data.

12. A display device comprising:

a display panel which includes a plurality of subpixels and a power line connected to the plurality of subpixels;

a data driver configured to supply a data signal to the plurality of subpixels based on a data control signal and image data;

a gate driving circuit configured to supply a scan signal to the plurality of subpixels based on a gate control signal;

a voltage generator configured to supply a gamma voltage to the data driver and an initialization voltage to the power line based on a voltage control signal; and a controller configured to receive input image data and change at least one of the gate control signal, the voltage control signal, or the image data based on a count value corresponding to a number of frames in which an image is continuously played and a luminance control signal to control luminance of an image displayed on the display panel, wherein the count value is generated in response to a memory write signal indicating that the input image data of a next frame among the frames has been received, and a memory write sustain signal indicating that the input image data of the next frame is continuously received.

13. The display device of claim 12, wherein at least one of the plurality of subpixels includes:

a pixel driving circuit to which a first power voltage is applied, and a light-emitting element including an anode connected to the pixel driving circuit and a cathode to which a second power voltage, and wherein the initialization voltage is applied to the anode through the pixel driving circuit.

14. The display device of claim 13, wherein the controller is configured to:

generate a tearing signal based on a vertical synchronization signal, and increase the count value when the memory write signal and the memory write sustain signal are received during a period corresponding to one frame period during which the tearing signal is continuously input.

15. The display device of claim 14, wherein the controller is configured to:

generate a mode indicator signal having a first level when the count value is greater than or equal to a preset threshold value and the received luminance control signal has a value that is less than or equal to the preset threshold value, and generate the mode indicator signal having a second level when the count value is less than or equal to the preset threshold value or the luminance control signal has the value that is greater than or equal to the preset threshold value.

16. The display device of claim 15, wherein the controller is configured to:

output the voltage control signal to control a level of the initialization voltage to be lower than a level of the second power voltage based on the mode indicator signal with the first level, and output the voltage control signal to control the level of the initialization voltage to be higher than the level of the second power voltage based on the mode indicator signal with the second level.

17. A method of driving a display device including a controller, the method comprising:

determining, by the controller, whether display luminance of an image is less than or equal to a preset threshold value and the image is played for a preset threshold period or more by generating a count value in response to a vertical synchronization signal indicating a start of a frame, a memory write signal indicating that input image data of a next frame has been received, and a memory write sustain signal indicating that the input image data of the next frame is continuously received;

displaying the image in a first mode when the display luminance of the image is greater than the preset threshold value, or the image is played for a period that is less than the preset threshold period; and displaying the image in a second mode when the display luminance of the image is lower than or equal to the preset threshold value and the image is played for the preset threshold period or more.

18. The method of claim 17, wherein, in displaying the image in the first mode:

in the display device, an initialization voltage applied to an anode of a light-emitting element included in the display device is applied at a first level that is lower than that of a power voltage applied to a cathode of the light-emitting element, in the display device, a data signal for displaying a black gray scale is applied with a small margin, and in the display device, an on-bias voltage is applied to a driving transistor, which is for supplying a driving current to the light-emitting element, a first number of times, and wherein in displaying the image in the second mode:

in the display device, the initialization voltage applied to the anode of the light-emitting element included in the display device is applied at a second level that is higher than that of the power voltage applied to the cathode of the light-emitting element, in the display device, the data signal for displaying the black gray scale is applied with a large margin, and in the display device, the on-bias voltage is applied to the driving transistor a second number of times that is greater than the first number of times.

19. An electronic device comprising:

a display panel which includes a plurality of subpixels and a power line connected to the plurality of subpixels;

a data driver configured to supply a data signal to the plurality of subpixels based on a data control signal and image data;

a gate driving circuit configured to supply a scan signal to the plurality of subpixels based on a gate control signal;

a voltage generator configured to supply a gamma voltage to the data driver and an initialization voltage to the power line based on a voltage control signal;

a main processor configured to output a luminance control signal to control luminance of an image displayed on the display panel; and a controller configured to receive input image data and change at least one of the gate control signal, the voltage control signal, or the image data based on a count value corresponding to a number of frames in which an image is continuously played and the luminance control signal, wherein the count value is generated in response to a memory write signal indicating that the input image data of a next frame among the frames has been received, and a memory write sustain signal indicating that the input image data of the next frame is continuously received.

* * * * *